United States Patent
Miyachi et al.

(10) Patent No.: US 9,291,283 B2
(45) Date of Patent: Mar. 22, 2016

(54) HYDRAULIC CONTROL DEVICE

(75) Inventors: Eiji Miyachi, Nishio (JP); Hisashi Ono, Okazaki (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 919 days.

(21) Appl. No.: 13/445,619

(22) Filed: Apr. 12, 2012

(65) Prior Publication Data
US 2012/0261009 A1  Oct. 18, 2012

(30) Foreign Application Priority Data

Apr. 14, 2011 (JP) ................................. 2011-090217

(51) Int. Cl.
*F01L 1/34* (2006.01)
*F01M 1/16* (2006.01)
(Continued)

(52) U.S. Cl.
CPC ............... *F16K 47/10* (2013.01); *F01L 1/3442* (2013.01); *F01M 1/16* (2013.01); *F01M 1/20* (2013.01); *F04C 14/26* (2013.01); *F04C 14/265* (2013.01); *F15B 11/162* (2013.01); *F01L 2001/3443* (2013.01); *F01L 2001/3444* (2013.01); *F01L 2001/34426* (2013.01); *F01L 2001/34433* (2013.01); *F01L 2001/34466* (2013.01); *F01L 2001/34473* (2013.01);
(Continued)

(58) Field of Classification Search
CPC ............ F16K 47/10; F01M 1/16; F01M 1/20; F04C 14/26; F04C 14/265; F01L 1/3442; Y10T 137/7847; Y10T 137/86002
See application file for complete search history.

(56) References Cited

U.S. PATENT DOCUMENTS

| | | | | |
|---|---|---|---|---|
| 4,452,188 A | * | 6/1984 | Kosuda et al. | 123/90.18 |
| 5,052,433 A | * | 10/1991 | Levenez | 137/513.3 |

(Continued)

FOREIGN PATENT DOCUMENTS

| | | |
|---|---|---|
| DE | 199 23 345 A1 | 11/2000 |
| JP | 7-63026 A | 3/1995 |

(Continued)

OTHER PUBLICATIONS

The extended European Search Report issued Aug. 16, 2013, by the European Patent Office in corresponding European Patent Application No. 12163591.6. (6 pages).

(Continued)

*Primary Examiner* — Atif Chaudry
(74) *Attorney, Agent, or Firm* — Buchanan Ingersoll & Rooney PC

(57) ABSTRACT

A hydraulic control device includes a first predetermined portion receiving the oil discharged from a pump, a first channel establishing communication between the pump and the first predetermined portion, a second channel branched from the first channel for supplying oil to a second predetermined portion, a flow passage area regulation unit arranged on the second channel and equipped with a spool that moves in a flow passage area increasing direction when an oil pressure in the second channel increases and in a decreasing direction when the oil pressure decreases, and a bypass channel, which is provided separately from a portion of the second channel where the spool disconnects the second channel, establishes communication between an upstream side and a downstream side of the second channel relative to the flow passage area regulation unit and supplies oil to the second predetermined portion even when the spool disconnects the second channel.

8 Claims, 12 Drawing Sheets

(51) Int. Cl.
   *F01M 1/20*   (2006.01)
   *F16K 47/10*  (2006.01)
   *F04C 14/26*  (2006.01)
   *F01L 1/344*  (2006.01)
   *F15B 11/16*  (2006.01)
   *F15B 13/02*  (2006.01)

(52) U.S. Cl.
   CPC ..... *F01L 2001/34479* (2013.01); *F15B 13/022* (2013.01); *Y10T 137/7847* (2015.04); *Y10T 137/85978* (2015.04); *Y10T 137/86002* (2013.01)

(56) References Cited

U.S. PATENT DOCUMENTS

| | | |
|---|---|---|
| 8,834,132 B2 | 9/2014 | Kato et al. |
| 2007/0175521 A1 | 8/2007 | Krug-Kussius |
| 2009/0311115 A1 | 12/2009 | Ono et al. |
| 2011/0067667 A1 | 3/2011 | Miyachi et al. |
| 2011/0085921 A1 | 4/2011 | Kato et al. |
| 2013/0139916 A1 | 6/2013 | Miyachi |

FOREIGN PATENT DOCUMENTS

| | | |
|---|---|---|
| JP | 10-141036 A | 5/1998 |
| JP | 2001-336410 A1 | 12/2001 |
| JP | 2009-299573 A | 12/2009 |
| JP | 2011-80430 A | 4/2011 |
| WO | 2012/032813 A1 | 3/2012 |

OTHER PUBLICATIONS

Japanese Office Action issued Feb. 5, 2015, by the Japan Patent Office, in corresponding Japanese Patent Application No. 2011-090217 with English translation of Office Action(4 pages).

* cited by examiner

HYDRAULIC CONTROL DEVICE

CROSS REFERENCE TO RELATED APPLICATIONS

This application is based on and claims priority under 35 U.S.C. §119 to Japanese Patent Application 2011-090217, filed on Apr. 14, 2011, the entire content of which is incorporated herein by references.

TECHNICAL FIELD

This disclosure generally relates to a hydraulic control device.

BACKGROUND DISCUSSION

A type of hydraulic control device is disclosed in JP2009-299573A (hereinafter referred to as Patent reference 1), which includes a pump driven by a rotation of an engine for discharging oil, a valve timing control device actuated by an oil pressure provided by the oil supplied by the pump, and an engine lubricating device configured to lubricate engine parts by the oil supplied by the pump.

The hydraulic control device disclosed in Patent reference 1 includes a valve device that is configured to supply oil to the valve timing control device on a priority basis when the oil pressure applied to the valve timing control device is low by limiting the oil flow amount from the pump to the engine lubricating device. As a result, when the rotational speed of the pump is low, the oil pressure applied to the valve timing control device is secured on the priority basis, thus, the valve timing control device is adequately actuated without having an electric pump for supplementing a performance of the pump.

The valve device of the hydraulic control device disclosed in Patent reference 1 includes a valve component, a retainer, and a space corresponding to each of the valve component and the retainer to slide, the spaces, which leaves a room for improvement from a point of view in reducing size of the valve system or reducing space the hydraulic control device occupies on installment.

FIG. 14 shows a known device considering the above improvement, in which a flow passage area regulation unit is reduced for the purpose of reducing the space the device occupies in the engine. The known hydraulic control device supplies the oil discharged from a pump 101 to a valve timing control device 102 and to a main gallery 108. A first channel 111 connects the pump 101 and the valve timing control device, and a second channel 113 branched from the first channel 111 connects to the main gallery 108. The second channel 113 is provided with a flow passage area regulation unit 103, which controls a dimension of a flow passage area of the second channel 113. The flow passage area regulation unit 103 includes a spool 131 and a biasing member 132. The spool 131 includes a first surface 131*d* subjected to a pressure and a second surface 131*e* subjected to the pressure. A surface area of the second surface 131*e* is smaller compared to that of the first surface 131*d*. The first surface 131*d* and the second surface 131*e* are formed to face each other with the second channel 113 therebetween. The biasing member 132 biases the spool 131 in a direction to close the second channel 113.

With the hydraulic control device of the above configuration, the spool 131 receives a force similar to the oil pressure of the second channel 113 multiplied by an area difference between the first surface 131*d* subjected to a pressure and the second surface 131*e* subjected to the pressure and simultaneously receives a biasing force in the direction to close the second channel 113. When the oil pressure in the second channel 113 is small, the spool 131 receives the biasing force of the biasing member 132 predominately, which in turn moves the spool 131 in the direction to close the second channel 113 and reduces the dimension of the flow passage area of the second channel 113. When the oil pressure in the second channel 113 becomes larger, the spool 131 moves against the biasing force of the biasing member 131 in the direction to open the second channel 113 and increases the dimension of the flow passage area of the second channel 113.

In other words, when the oil pressure applied by the oil supplied from the pump 101 is small, the dimension of the flow passage area of the second channel 113 reduces, and when the oil pressure applied by the oil supplied from the pump 101 becomes large, the dimension of the flow passage area of the second channel 113 increases. As can be seen from the above, the flow passage area regulation unit 103 controls the dimension of the flow passage area with the movements of the spool 131 alone. Having an area for the movements of the spool 131 alone, the hydraulic control device with the above configuration is advantageous in reducing the dimension of the flow passage area regulation unit 103.

FIG. 15 is a cross-sectional view taken along a line XV-XV illustrating the spool 131 in a most closed state in which the spool regulates the flow passage area of the second channel 113 to the narrowest state, which is the state similar to the state shown in FIG. 14. The flow passage area of the second channel 113 at this time is an arc area A not closed by the spool 131 out of the area of an opening 133*a* for a flow passage formed on a valve body 133. The area of the arc area A is determined so as to supply a minimal oil pressure used at the main gallery 108 in a downstream of the flow passage area regulation unit 103.

When the flow passage area is regulated to the narrowest state, a dimension of the arc area A is small. In other words, a slight positional change of the spool 131 affects largely the flow passage dimension of the second channel 113. Even if the tolerance, for example, for the position of the opening 133*a* for the flow passage or for a dimension of the spool 131 are within the allowable range, errors in sum may result in the dimension of the arc area A to be substantially different from the predetermined dimension. When the dimension of the arc area A is substantially different from the predetermined dimension, a reliability of a pressure control of the hydraulic control device becomes less reliable. Reducing errors in each component by increasing processing accuracy in turn results in a disadvantage of increasing manufacturing cost of the hydraulic control device.

A need thus exists for a hydraulic control device, which is not susceptible to the drawbacks mentioned above.

SUMMARY

According to an aspect of this disclosure a hydraulic control device includes a pump for discharging oil, a first predetermined portion configured to receive the oil discharged from the pump, a first channel establishing a communication between the pump and the first predetermined portion, a second channel branched from the first channel for supplying oil to a second predetermined portion arranged separately from the first predetermined portion, a flow passage area regulation unit arranged on the second channel, the flow passage area regulation unit equipped with a spool moving in a direction for increasing a flow passage area when an oil pressure in the second channel increases and moving in a direction for decreasing a flow passage area when the oil pressure in the second channel decreases, and a bypass channel provided separately from a portion of the second channel where the spool disconnects the second channel, the bypass channel establishing a communication between an upstream side and a downstream side of the second channel relative to the flow passage area regulation unit, the bypass channel supplying oil to the second predetermined portion even in a closed state in which the spool disconnects the second channel.

According to another aspect of this disclosure, a hydraulic control device includes a pump for discharging oil, a first predetermined portion configured to receive the oil discharged from the pump, a first channel establishing a communication between the pump and the first predetermined portion, a second channel branched from the first channel for supplying oil to a second predetermined portion arranged separately from the first predetermined portion, a flow passage area regulation unit moving in the direction for increasing the flow passage area when an oil pressure in the second channel increases and moving in a direction for decreasing a flow passage area when the oil pressure in the second channel decreases, and a bypass channel supplying oil to the second predetermined portion during which the flow passage area regulation unit is disconnecting the second channel by establishing a communication between an upstream side and a downstream side of the second channel relative to the flow passage area regulation unit.

According to further aspect of this disclosure, a hydraulic control device includes a pump for discharging oil, a first predetermined portion configured to receive the oil discharged from the pump, a first channel establishing a communication between the pump and the first predetermined portion, a second channel branched from the first channel and supplying oil to a second predetermined portion arranged separately from the first predetermined portion, a flow passage area regulation unit arranged on the second channel for controlling an oil pressure applies on the first predetermined portion by controlling a flow passage area of the second channel, and a bypass channel supplying oil to the second predetermined portion even when the flow passage area regulation unit is disconnecting the second channel.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Embodiments of a hydraulic control device applied to an automotive engine will be described as follows with references to drawings. In the embodiments disclosed here, a valve timing control device 2 adapted for controlling intake valves serves as a first predetermined portion.

Figure 1:
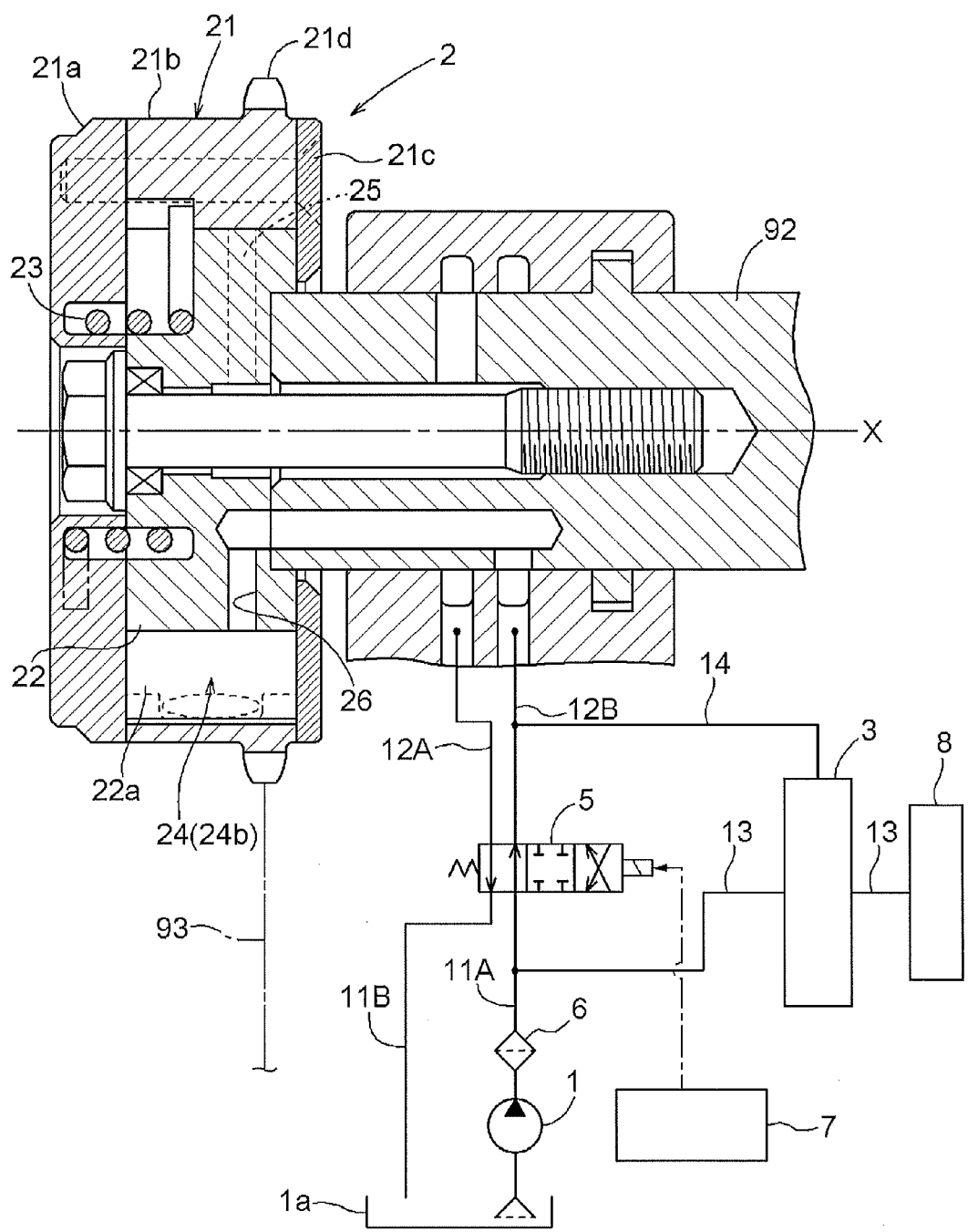
FIG. 1 is a general representation of a hydraulic control device according to embodiments disclosed here.

A general configuration of the hydraulic control device according to a first embodiment will be described as follows. As shown in FIG. 1, the hydraulic control device includes a pump 1 driven by a rotation of an engine and the valve timing control device 2 in which a relative rotational phase changes by a supply or a discharge of oil. The valve timing control device 2 operates with the supply or the discharge of oil controlled by an oil control valve (OCV) 5. The pump 1 and the oil control valve (OCV) 5 are connected with an oil passage 11A for discharging oil. The valve timing control device 2 and the oil control valve (OCV) 5 are connected with an oil passage 12A for an advanced angle control and an oil passage 12B for a retarded angle control. The oil passage 11A for discharging oil, the oil passage 12A for the advanced angle control, and the oil passage 12B for the retarded angle control each serves as a first channel. An oil passage 13 for a lubricating oil, which serves as a second channel, branches from the oil passage 11A for discharging oil and supplies oil to a main gallery 8, which serves as a second predetermined portion. The oil passage 13 for the lubricating oil is provided with a flow passage area regulation unit 3 for controlling a dimension of the flow passage area. Each of the oil passages are formed, for example, on a cylinder case of an engine.

The pump 1 according to the first embodiment will be described next. A rotational driving power of a crankshaft is transmitted to the pump 1, which in turn drives the pump 1 mechanically for discharging oil. The pump 1 sucks in oil retained in an oil pan 1a and discharges the oil into the oil passage 11A for discharging oil, as shown in FIG. 1. The oil passage 11A for discharging oil is provided with an oil filter 6 that filtrates dirt, sludge, small objects and the like, which an oil strainer does not filtrate. The oil filtered by the oil filter 6 is supplied to the valve timing control device 2 and the main gallery 8. The main gallery 8 refers to sliding members in the engine in general, for example, a piston, a cylinder, a bearing for the crankshaft and the like.

The oil discharged from the valve timing control device 2 is returned to the oil pan 1a via the oil control valve (OCV) 5 and an oil return passage 11B. The oil supplied to the main gallery 8 is collected in the oil pan 1a via engine cover portions and the like. The oil leaked from the valve timing control device 2 is collected in the oil pan 1a also via engine cover portions and the like.

Figure 2:
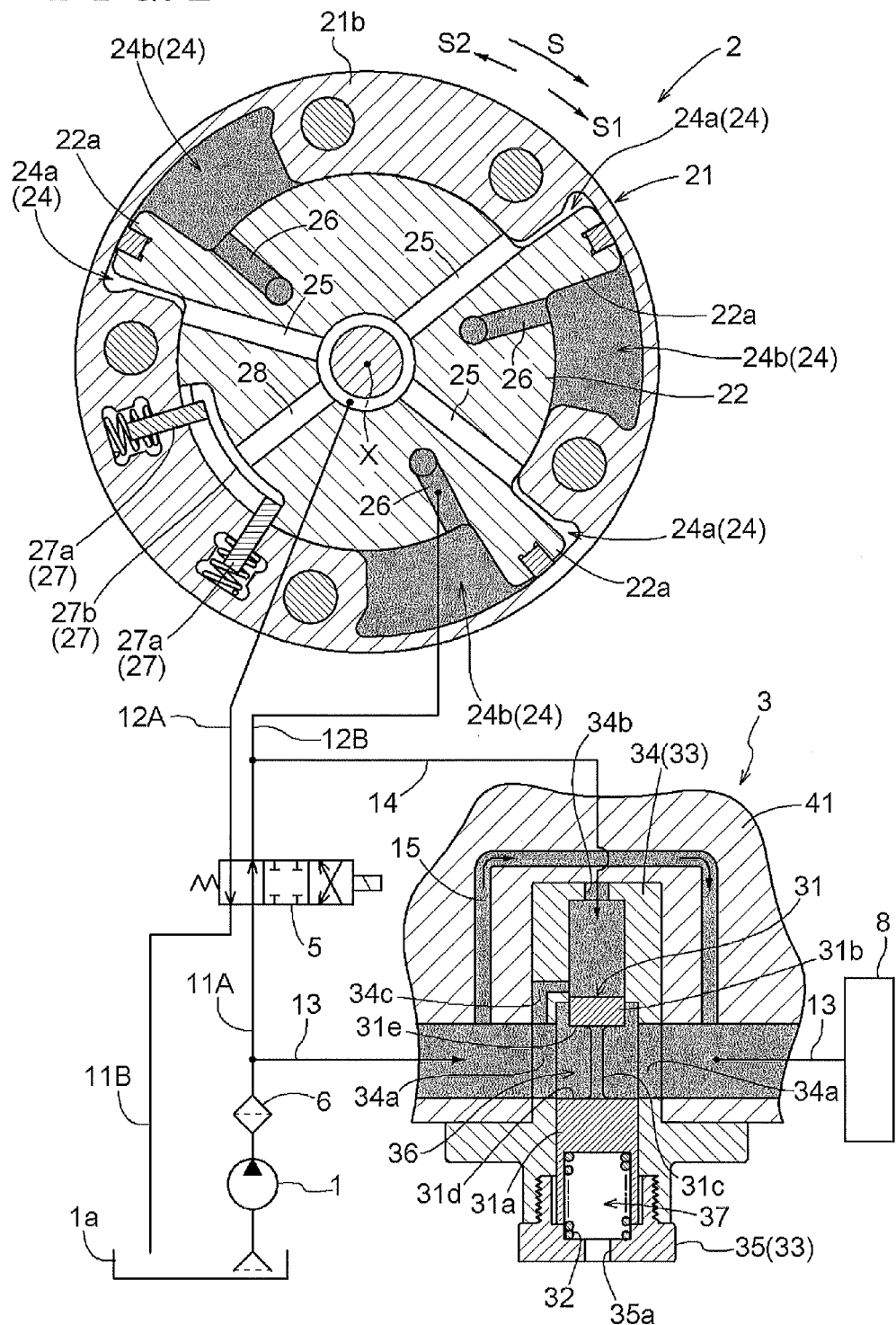
FIG. 2 illustrates a state in which a flow passage area regulation unit is forced to remain in a fully open state.

The valve timing control device 2 according to the first embodiment will be described next. In general, as shown in FIG. 1, the valve timing control device 2 includes a housing 21 that synchronously-rotates relative to the crankshaft of the engine and an inner rotor 22 having a same center axis X as the housing 21 and synchronously-rotates relative to a camshaft 92. As shown in FIG. 2, the valve timing control device 2 includes a locking mechanism 27 configured to restrain a relative rotational phase of the inner rotor 22 relative to the housing 21 to a most retarded angle phase by restraining a relative rotational movement of the inner rotor 22 relative to the housing 21.

The housing 21 and the inner rotor 22 of the valve timing control device 2 will be described next in detail. As shown in FIG. 1, the inner rotor 22 is mounted on an end portion of the camshaft 92. The housing 21 includes a front plate 21a on a side opposite to which the camshaft 92 is connected, an outer rotor 21b provided with timing sprockets 21d being integrated, and a rear plate 21c on a side to which the camshaft 92 is connected. The outer rotor 21b is equipped outward of the inner rotor 22 and is sandwiched between the front plate 21a and the rear plate 21c. Bolts or means alike connect the front plate 21a, the outer rotor 21b, and the rear plate 21c.

When the crankshaft is rotationally driven, the rotational drive power is generated and is transmitted to the timing sprocket 21d via a power transmission member 93, which in turn rotationally drives the housing 21 in rotational directions S shown in FIG. 2. The rotational drive of the housing 21 rotationally drives the inner rotor 22 in the rotational directions S so that the camshaft 92 rotates. A cam provided on the camshaft 92 is configured to press down and opens an intake valve of the engine.

As shown in FIG. 2, three fluid pressure chambers 24 are formed with the outer rotor 21b and the inner rotor 22. A plurality of vanes 22a are formed on the inner rotor 22 along the rotational directions S to project outward in a radial direction with each vane 22 being separated by a spacing therebetween. Each of the vanes 22a is configured to be disposed within the corresponding fluid pressure chamber 24. Each of the fluid pressure chambers 24 is separated with the corresponding vane 22a to form a chamber 24a for the advanced angle control and a chamber 24b for the retarded angle control, which are arranged along the rotational direction S.

As shown in FIG. 1 and FIG. 2, passages 25 in communication with the chambers 24a for the advanced angle control are formed on the inner rotor 22 and the camshaft 92 such that each of the passages 25 connects to the corresponding chamber 24a for the advanced angle control. Passages 26 in communication with the chambers 24b for the retarded angle control are formed on the inner rotor 22 and the camshaft 92 such that each of the passages 26 connects to a corresponding chamber 24b for the retarded angle control. As shown in FIG. 1, the passages 25 in communication with the chambers 24a for the advanced angle control connect to the oil passage 12A for the advanced angle control that connects to the control valve (OCV) 5. The passages 26 in communication with the chambers 24b for the retarded angle control connect to the oil passage 12B for the retarded angle control that connects to the oil control valve (OCV) 5.

As shown in FIG. 1, a torsion spring 23 is arranged to relate the inner rotor 22 and the front plate 21a. The torsion spring 23 biases the inner rotor 22 in an advanced angle direction S1 so as to work against an average phase change force generated by a change in a cam torque that works in a retarded angle direction S2. With the configuration described above, the relative rotational phase of the inner rotor 22 may be shifted smoothly and swiftly in the advanced angle direction S1 to be described later.

The locking mechanism 27 of the valve timing control device 2 will be described next in detail. At the engine start at which the oil pressure is unstable, the locking mechanism 27 restrains the relative rotational phase of the inner rotor 22 to the most retarded angle phase by retaining the housing 21 and the inner rotor 22 in a predetermined relative position. The configuration described above provides an appropriate engine start. At the same time, the inner rotor 22 is prevented from moving rapidly back and forth in axial directions, which occurs at the engine start, during an idling state, and the similar situations, when a phase change force is generated by the changes in the cam torque.

As shown in FIG. 2, the locking mechanism 27 includes two locking members 27a in a plate form, a locking recess 27b, and a passage 28 in communication with the locking mechanism 27. The locking recess 27b, having a predetermined length in a direction of a relative rotation, is formed on an outer peripheral surface of the inner rotor 22. The locking members 27a are arranged at containment portions formed on the outer rotor 21b such that project or retreat in the radial directions with respect to the locking recess 27b. The locking members 27a are constantly biased inward in the radial direction, that is toward the locking recess 27b. The passage 28 in communication with the locking mechanism 27 connects the locking recess 27b and the passages 25 in communication with chambers 24a for the advanced angle control. As a result, when the chambers 24a for the advanced angle control are supplied with oil, the locking recess 27b is supplied with oil similarly. When the oil is discharged from the chambers 24a for the advanced angle control, the oil is discharged from the locking recess 27b likewise.

Figure 3:
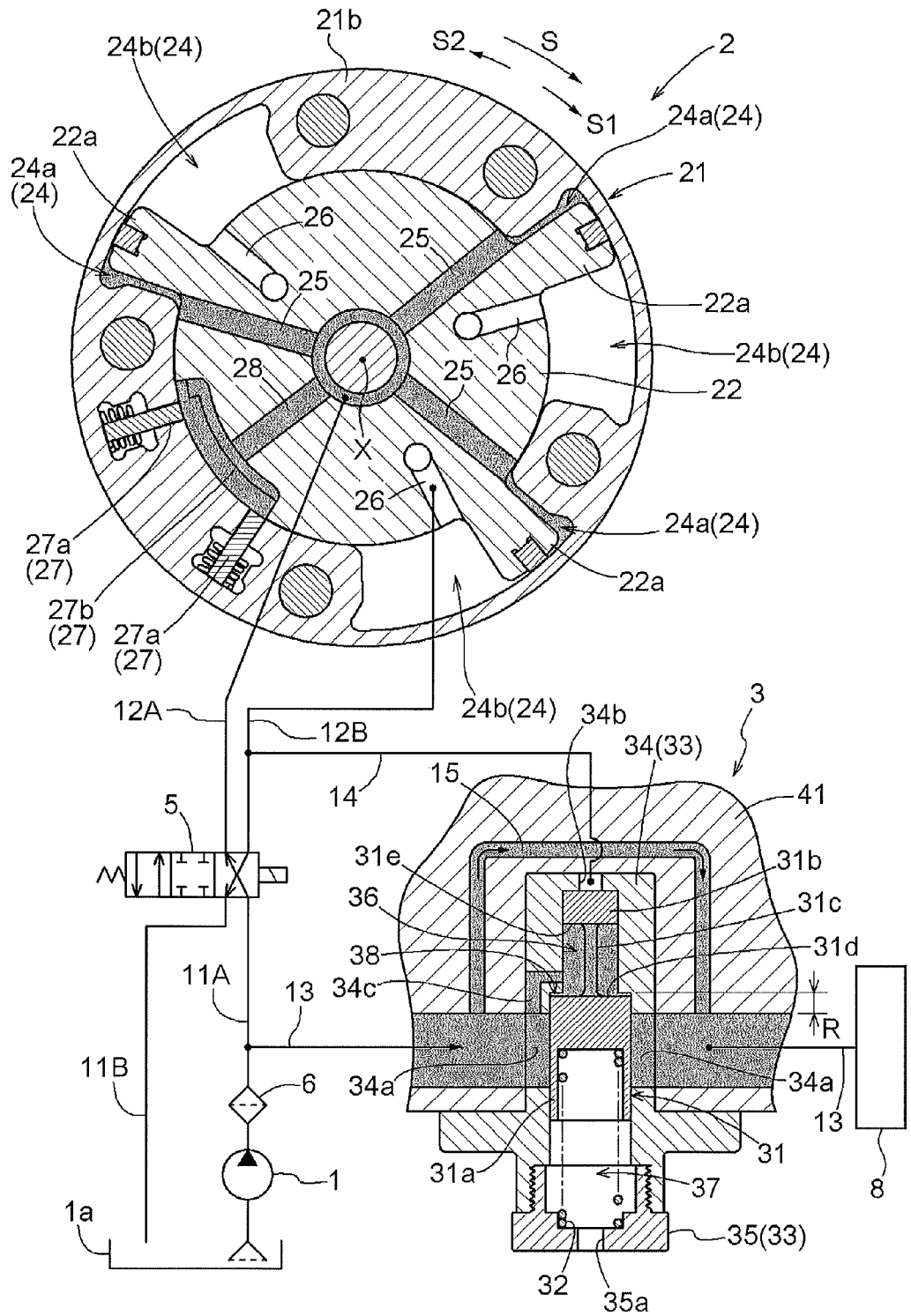
FIG. 3 illustrates a state in which the flow passage area regulation unit is in a closed state.

When the oil is discharged from the locking recess 27b, each of the locking members 27a may project into the locking recess 27b. As shown in FIG. 2, when both of the locking members 27a enter the locking recess 27b, each of the locking members 27a engages with a corresponding end in the circumferential direction of the locking recess 27b. As a result, the relative rotational movement of the inner rotor 22 relative to the housing 21 is restrained and restrains the relative rotational phase of the inner rotor 22 to the most retarded angle phase. As shown in FIG. 3, when the oil is supplied to the locking recess 27b, both of the locking members 27a retreat from the locking recess 27b so that the relative rotational phase of the inner rotor 22 shifts to an unrestrained state, that is to a state in which the inner rotor 22 may freely make the relative rotational movement. Hereinafter, a state in which the locking mechanism 27 is restraining the relative rotational phase of the inner rotor 22 to the most retarded angle phase is referred to as a "locked state" and a state being released from the locked state is referred to as an "unlocked state."

The oil control valve (OCV) 5 according to the first embodiment will be described next. The oil control valve (OCV) 5 is electromagnetically controlled. The oil control valve (OCV) 5 controls an oil supply, an oil discharge, and an interruption of the oil supply or of the oil discharge in the passages 25 in communication with the chambers 24a for the advanced angle control and in the passages 26 in communication with the chambers 24b for the retarded angle control. The oil control valve (OCV) 5 adopts a spool system and operates based on an electricity supply amount controlled by an engine control unit (ECU) 7. The oil control valve (OCV) 5 provides, for example, a state in which the oil is supplied to the oil passage 12A for the advanced angle control and the oil is discharged from the oil passage 12B for the retarded angle control, a state in which the oil is discharged from the oil passage 12A for the advanced angle control and the oil is supplied to the oil passage 12B for the retarded angle control, and a state in which the oil supply or the oil discharge in the oil passage 12A for the advanced angle control and the oil passage 12B for the retarded angle control is interrupted.

A control operation in which the oil passage 12A for the advanced angle control being supplied with oil and the oil in the oil passage 12B for the retarded angle control being discharged is referred to as the "advanced angle control." When the advanced angle control is performed, the vanes 22a make the relative rotational movement in the advanced angle direction S1 relative to the outer rotor 21b so that the relative rotational phase of the inner rotor 22 shifts toward the advanced angle. A control operation in which the oil in the oil passage 12A for the advanced angle control being discharged and the oil passage 12B for the retarded angle control being supplied with oil is referred to as the "retarded angle control." When the retarded angle control is performed, the vanes 22a make the relative rotational movement in the retarded angle direction S2 relative to the outer rotor 21b so that the relative rotational phase of the inner rotor 22 shifts toward the retarded angle. When a control for interrupting the oil supply or the oil discharge in the oil passage 12A for the advanced angle control and the oil passage 12B for the retarded angle control is performed, the relative rotational phase of the inner rotor 22 may be retained in an arbitrary phase.

The oil control valve (OCV) 5 is configured so that supplying power to the oil control valve (OCV) 5 makes the advanced angle control possible and cutting the power supply to the oil control valve (OCV) 5 makes the retarded angle control possible. A valve opening setting for the oil control valve (OCV) 5 is controlled with a duty ratio of the electricity supplied to the electromagnetic solenoid of the oil control valve (OCV) 5, which makes a subtle adjustment of an oil supply amount and an oil discharge amount possible.

As can be seen from above, the oil control valve (OCV) 5 controls the oil pressure applied to the vanes 22a by supplying oil to, discharging oil from, or retaining the amount of oil in the chambers 24a for the advanced angle control and the chambers 24b for the retarded angle control. Thus, relative rotational phase of the inner rotor 22 shifts toward the advanced angle, toward the retarded angle, or remains in the arbitrary phase.

An operation of the valve timing control device 2 according to the first embodiment will be described next referring to FIGS. 2 to 6. With the configuration described above, the inner rotor 22 makes a smooth relative rotational movement relative to the housing 21 in a predetermined range with the center axis X as an axis. Said predetermined range in which the inner rotor 22 makes the relative rotational movement relative to housing 21, which corresponds to a phase difference between the most advanced angle phase and the most retarded angle phase, may also be regarded as the range in which each of the vanes 22a makes a positional change within the corresponding fluid pressure chamber 24. The state in which a volume of the chambers 24a for the advanced angle control becomes maximal is regarded as the most advanced angle phase and the state in which a volume of the chambers 24b for the retarded angle control becomes maximal is regarded as the most retarded angle phase.

The valve timing control device 2 is equipped with a crank angle sensor for detecting a rotational angle of the crankshaft of the engine and a camshaft angle sensor for detecting a rotational angle of the camshaft 92. The engine control unit (ECU) 7 detects the relative rotational phase of the valve timing control device 2 from the detection results of the crank angle sensor and the camshaft angle sensor. The engine control unit (ECU) 7 is equipped with a signal communication system for receiving information, for example, whether an ignition key is operated in an ON or OFF state, or an oil temperature detected by an oil temperature sensor. Inside a memory of the engine control unit (ECU) 7, control information for controlling the relative rotational phase of the valve timing control device 2 to an optimal state appropriate to an operational condition of the engine is stored. From the control information above combined with operational information, for example, engine speed and a coolant temperature, the engine control unit (ECU) 7 controls the relative rotational phase of the valve timing control device 2.

Figure 4:
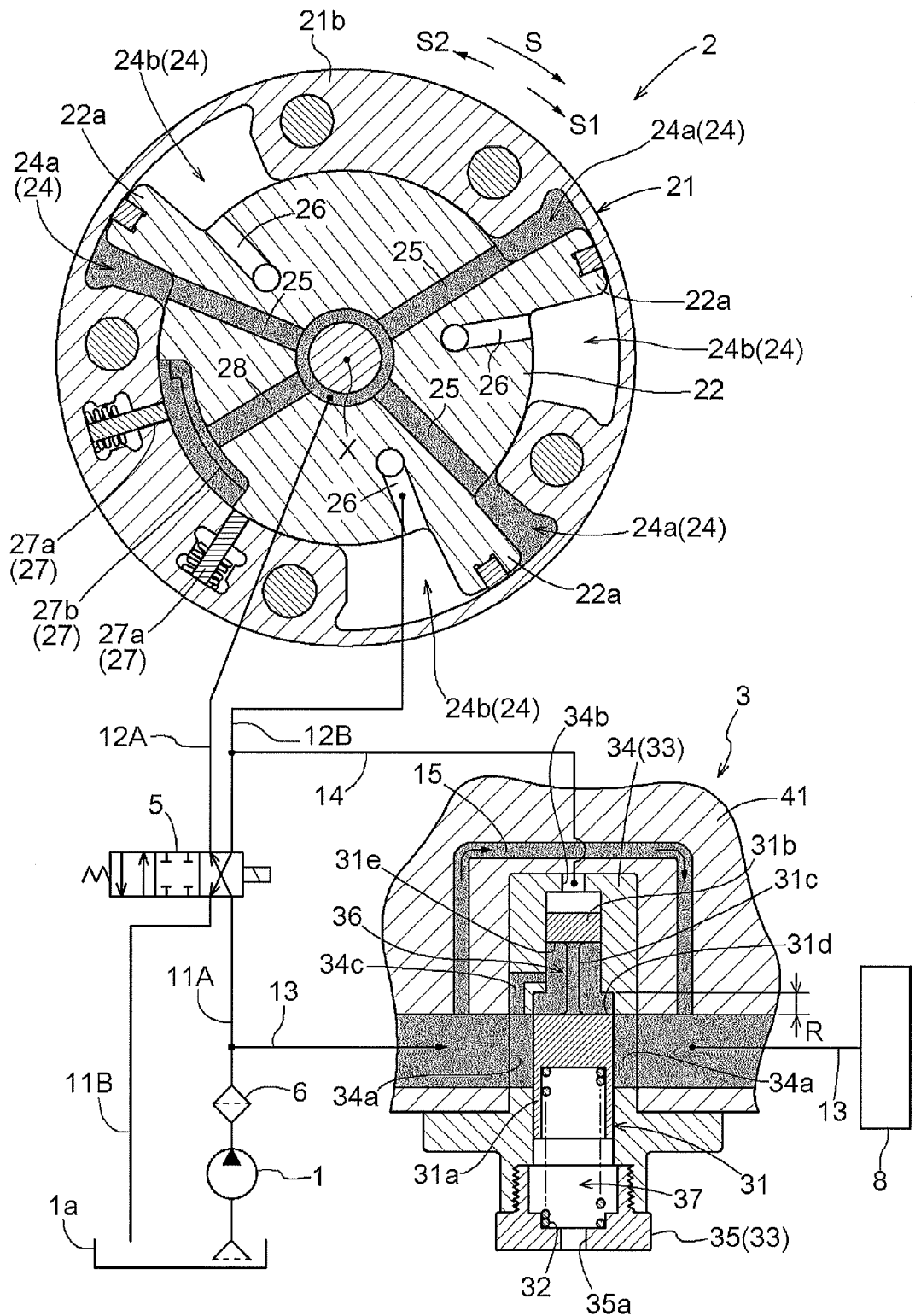
FIG. 4 illustrates a sate immediately before the flow passage area regulation unit is to be opened.
Figure 5:
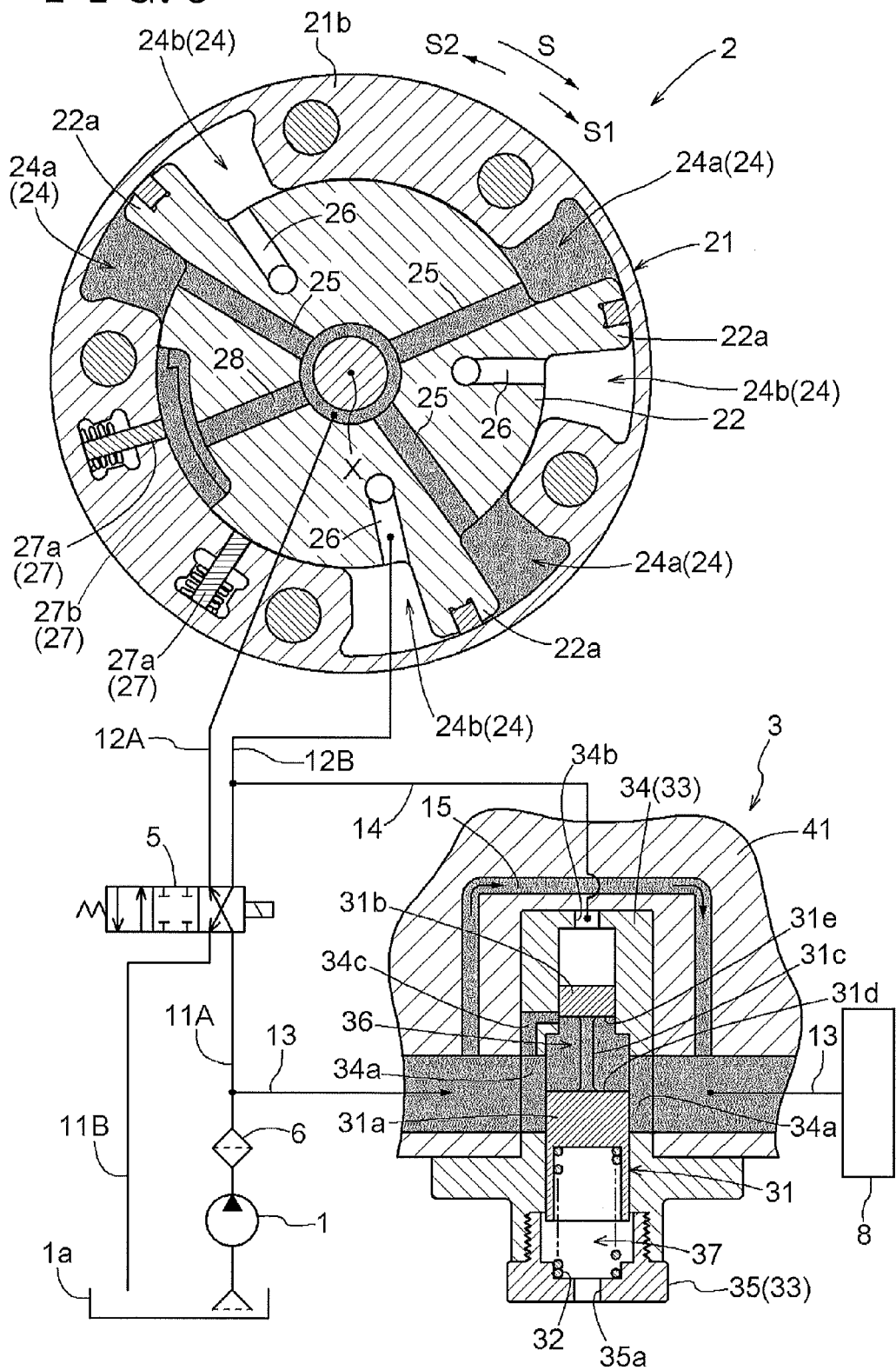
FIG. 5 illustrates a state in which the flow passage area regulation unit is in an open state.
Figure 6:
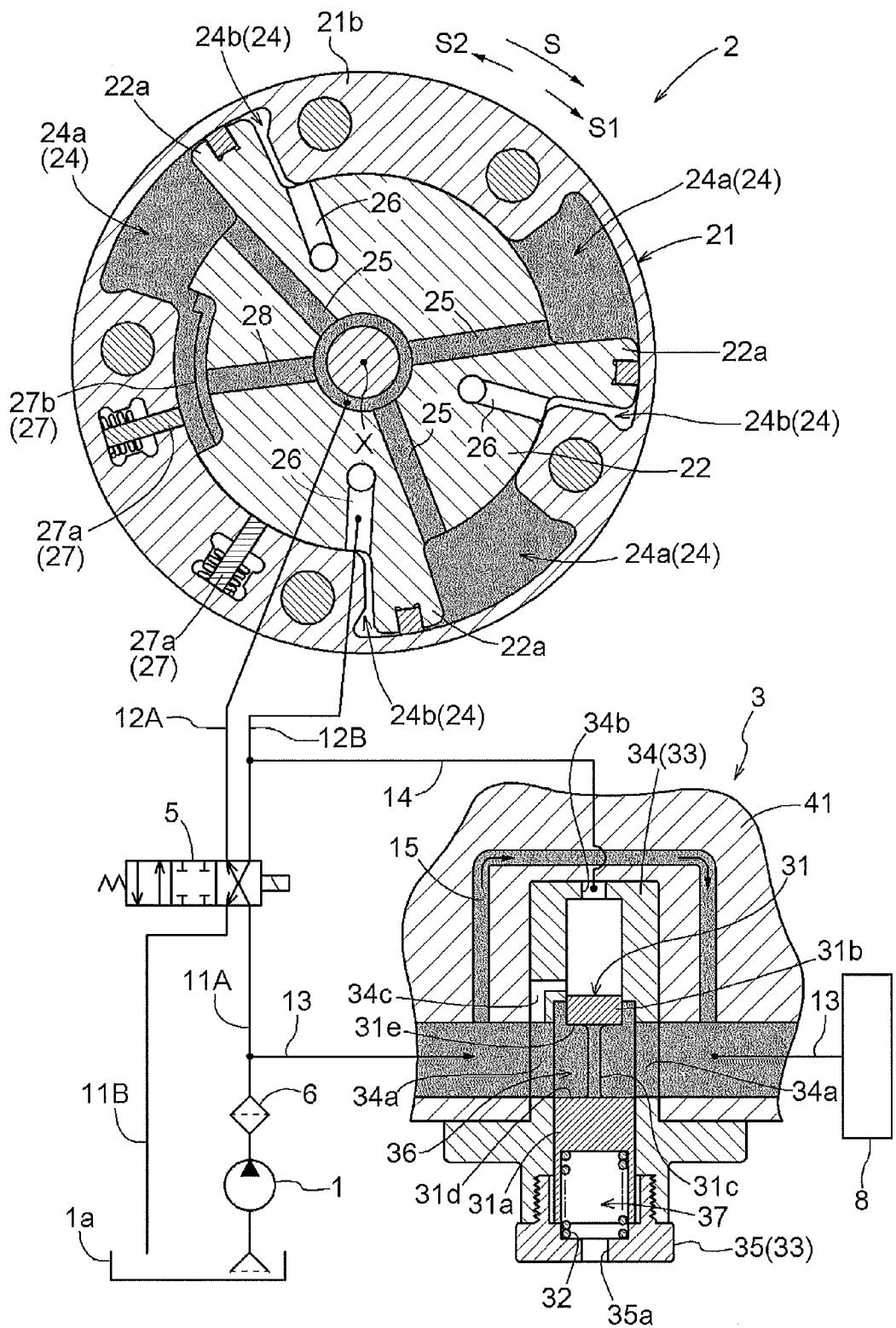
FIG. 6 illustrates a state in which the flow passage area regulation unit is in a fully open state.

In a state before the engine is started, the valve timing control device 2 is in the locked state by the locking mechanism 27, as shown in FIG. 2. When the ignition key is operated in the ON state, a cranking begins and the engine starts in a state where the relative rotational phase of the valve timing control device 2 is restrained to the most retarded angle phase. When the state of the engine shifts to the idling state, warming of a catalyst begins. After the warming of the catalyst ends and when an acceleration pedal is pressed, the power is supplied to the oil control valve (OCV) 5 for the advanced angle control, so as to shift the relative rotational phase of the valve timing control device 2 in the advanced angle direction S1. Thereupon, oil is supplied to the chambers 24a for the advanced angle control and the locking recess 27b, so that the state of the valve timing control device 2 shifts to the unlocked state, in which the locking members 27a are being retreated from the locking recess 27b, as shown in FIG. 3. When the state of the valve timing control device 2 shifts to the unlocked state, the valve timing control device 2 may shift the relative rotational phase freely to states as shown in FIGS. 4 to 6 according to the supply of oil to the chambers 24a for the advanced angle control. Thereafter, the relative rotational phase of the valve timing control device 2 shifts between the most advanced angle phase and the most retarded angle phase in response to a load on the engine, the engine speed, and the like.

Before the engine stops, the engine shifts to the idling state, in which the relative rotational phase of the valve timing control device 2 is in the most retarded angle phase. During the idling state, at least the locking member 27a in the direction of the advanced angle is projected into the locking recess 27b. When the ignition key is operated in the OFF state, the inner rotor 22 moves rapidly back and forth in circumference directions with the changes in the cam torque, which in turn makes the locking member 27a in the direction of the retarded angle also to project into the locking recess 27b and brings the valve timing control device 2 to the locked state, so that a next engine start operation may begin in a suitable state.

The flow passage area regulation unit 3 according to the first embodiment will be described next. The flow passage area regulation unit 3 includes a spool 31 configured to move orthogonally relative to the oil passage 13 for the lubricating oil, as shown in FIGS. 2 to 6. The spool 31 includes a large diameter portion 31a in a cylinder form, a small diameter portion 31b in a cylinder form having a smaller diameter than the diameter of the large diameter portion 31a, and a connecting portion 31c. The connecting portion 31c connects the central axis portions of each of the large diameter portion 31a and the small diameter portion 31b at the central axis portion of each. A first surface 31d subjected to a pressure is a surface on the large diameter portion 31a, the surface that faces the small diameter portion 31b. A second surface 31e subjected to the pressure is a surface on the small diameter portion 31b, the surface that faces the large diameter portion 31a. The connecting portion 31c is formed with an annular space 36 around the periphery. The annular space 36 functions as a channel for oil to flow through the oil passage 13 for the lubricating oil, when the spool 31 is not closing the oil passage 13 for the lubricating oil, as shown in FIG. 2.

The large diameter portion 31a of the spool 31 is formed with a space having an open end such that together with a valve body 33 housing the spool 31 forms a space 37 for containing a spring 32 where the spring 32 is retained. The spring 32 constantly biases the spool 31 in a direction to reduce the dimension of the flow passage area of the oil passage 13 for the lubricating oil. Hereinafter, the direction in which the spool 31 reduces the dimension of the flow passage area of the oil passage 13 for the lubricating oil, which is upward in FIG. 2, is referred to as a "closing direction", and the direction in which the spool 31 increases the dimension of the flow passage area of the oil passage 13 for the lubricating oil, which is downward in FIG. 2, is referred to as an "opening direction."

The valve body 33 includes a main body 34 and a plug member 35. The main body 34 is formed with openings 34a for the flow passage in two locations on a sidewall thereof, which connect with the oil passage 13 for the lubricating oil. Hereinafter, a state in which the spool 31 is moved to an end in the opening direction and the openings 34a for the flow passage being fully open is referred to as a "fully open state" as shown in FIGS. 2 and 6. Likewise, a state in which the spool 31 is moved to an end in the closing direction and the openings 34a for the flow passage are closed by the spool 31 is, hereinafter, referred to as a "closed state" as shown in FIG. 3. Another state in which the openings 34a for the flow passage are partially open is, hereinafter, referred to as an "open state", as shown in FIG. 5. Yet another state in which the spool 31 has moved in the opening direction from the closed state and where the spool 31 is at a position immediately before the openings 34a for the flow passage are to be opened is, hereinafter, referred to as a "state immediately before the open state", as shown in FIG. 4. To distinguish from the closed state, a state in between FIGS. 3 and 4, in which the spool 31 has moved from the end in the closing direction toward the opening direction however where the openings 34a for the flow passage are still closed by the spool 31 is, hereinafter, referred to as a "cut off state."

The plug member 35 is threaded and attaches to a threaded end of the main body 34 of the valve body 33 by screwing. When the plug member 35 is attached to the end of the main body 34 of the valve body 33, the spool 31 and the spring 32 are housed inside the valve body 33. When the space 37 for containing the spring 32 is an enclosed space, the spool 31 may not move smoothly when the spool 31 moves in the opening direction. Therefore, the plug member 35 is provided with a vent 35a that opens the space 37 for containing the spring 32 to atmosphere so that the spool 31 moves smoothly.

A dimension of the first surface 31d of the spool 31 subjected to the pressure is larger than the dimension of the second surface 31e subjected to the pressure. As a result, the spool 31 receives a force, hereinafter referred to as the force Fs, in the opening direction, which calculates to the oil pressure of the oil passage 13 for the lubricating oil multiplied by an difference in area determined by subtracting the area of the second surface 31e subjected to the pressure from the area of the first surface 31d subjected to the pressure. The spool 31 also receives a biasing force from the spring 32, hereinafter referred to as the biasing force Fp, in the closing direction. Furthermore, when the spool 31 in the closed state starts moving in the opening direction, a static frictional force, hereinafter referred to as the static frictional force Fsf, is generated between the outer peripheral surfaces of the large diameter portion 31a and the small diameter portion 31b of the spool 31 and the inner peripheral surface of the valve body 33. The static frictional force Fsf works on the spool 31 in the closing direction as a resistive force that is against the movement of the spool 31 in the opening direction.

In the closed state as shown in FIG. 3, when the oil pressure in the oil passage 13 for the lubricating oil is increased and the force Fs exceeds the sum of the biasing force Fp and the static frictional force Fsf, the spool 31 starts moving in the opening direction, and the state of the spool 31 shifts to the states as shown in FIG. 4, FIG. 5, and FIG. 6. By contrast, when the oil pressure in the oil passage 13 for the lubricating oil is decreased and the biasing force Fp predominates the force Fs, the spool 31 moves in the closing direction. In response to the increase and the decrease of the oil pressure in the oil passage 13 for the lubricating oil, an amount to which the large diameter portion 31a of the spool 31 blocks the oil passage 13 for the lubricating oil changes, so that the dimension of the flow passage area for the oil passage 13 for the lubricating oil is controlled.

As shown in FIG. 3, a supply passage 34c is formed on the main body 34 of the valve body 33 for the purpose of generating the force Fs by supplying oil to the annular space 36 from the oil passage 13 for the lubricating oil. In order to generate the force Fs, the oil pressure generated with the oil supplied to the annular space 36 needs to be applied to the whole area of the first surface 31d subjected to the pressure. Therefore, an initiation space 38 is provided between the first surface 31d subjected to the pressure and the main body 34 of the valve body 33, so that the oil may apply pressure on the first surface 31d subjected to the pressure even in the closed state.

The flow passage area regulation unit 3 is retained in the fully open state under a certain condition to be described later in detail. For the above purpose, the hydraulic control device according to the first embodiment is provided with an opening 34b for an actuation at an end portion of the main body 33 of the valve body 33, so that an oil passage 14 for the actuation, which is branched from the oil passage 12B for the retarded angle control, connects to the opening 34b for the actuation. With the above configuration, when the oil pressure in the oil passage 14 for the actuation is applied to the back surface of the second surface 31e subjected to the pressure, the spool 31 receives a force in the opening direction. The oil pressure from the oil passage 14 for the actuation is configured to apply to the whole area of the back surface of the second surface 31e subjected to the pressure. As a result, a large force is easily generated so that the flow passage area regulation unit 3 may be retained in the fully open state as shown in FIG. 2. The fully open state being retained as described above is, hereinafter, referred to as a "forced fully open state."

A predetermined amount of oil is supplied to the main gallery 8 even in the state in which the spool 31 is occluding the oil passage 13 for the lubricating oil. Therefore, a valve housing 41 in which the valve body 33 is installed is formed with an oil passage 15 for a communicative connection of the upstream side and the downstream side of the oil passage 13 for the lubricating oil relative to the flow passage area regulation unit 3. The oil passage 15 for the communicative connection serves as a bypass channel. The oil passage 15 for the communicative connection processed to have a pipe diameter with an accuracy within the design tolerance provides the predetermined amount of oil to the main gallery 8 during the cut off state, which is the state between the closed state as shown in FIG. 3 and the state immediately before the open sate as shown in FIG. 4.

As can be seen from the above descriptions, the spool 31 slides inside the valve body 33 with an effect of the oil pressure in the oil passage 13 for the lubricating oil or with the effect of the oil pressure in the oil passage 14 for the actuation in addition to the oil pressure in the oil passage 13 for the lubricating oil, so that the dimension of the flow passage area of the oil passage 13 for the lubricating oil is controlled.

An operation of the hydraulic control device according to the first embodiment will be described next referring to the drawings. Each of II, III, IV, V, and VI in FIGS. 7A to 7C indicates the state of the hydraulic control device described in FIGS. 2 to 6, respectively. In other words, II indicates the hydraulic control device in the forced fully open state, III indicates the closed state, between III to IV indicates the cut off state, IV indicates the state immediately before the open state, V indicates the open state, and VI indicates the fully open state.

Figure 7A:
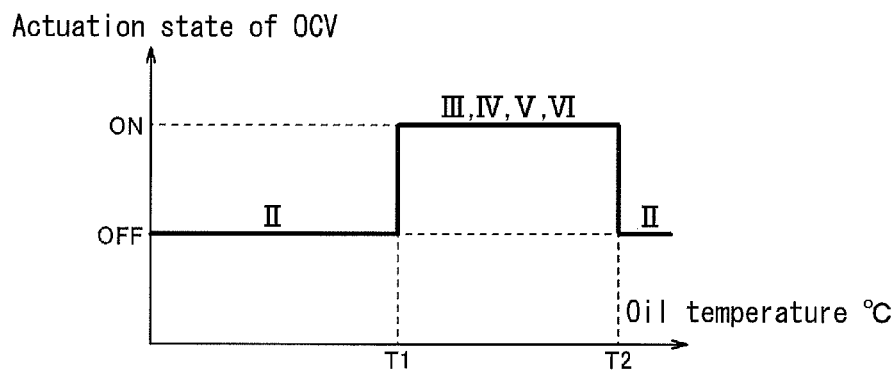
FIG. 7A illustrates a relationship between an oil temperature and an actuation state (ON/OFF) of an oil control valve (OCV)

At the engine start, the valve timing control device 2 without an operational necessity, does not use oil for generating the oil pressure. On the other hand, the main gallery 8 starts functioning immediately after the engine start, and starts using oil for lubrication. Therefore, when the oil temperature is lower than a first predetermined temperature T1, the oil control valve (OCV) 5 is in the OFF state in which the power is not supplied, as shown in FIG. 7A. In other words, as shown in FIG. 2, the state of the oil control valve (OCV) 5 is retained in the retarded angle control, in which the oil passage 12B for the retarded angle control and the oil passage 11A for discharging oil connect and the oil passage 12A for the advanced angle control and the oil return passage 11B connect.

In the state as shown in FIG. 2, the chambers 24b for the retarded angle control is provided with oil regardless of the valve timing control device 2 being in the locked state and the oil pressure in the oil passage 12B for the retarded angle control increases. The increased oil pressure is applied to the back surface of the second surface 31e subjected to the pressure via the passage 14 for the actuation, so that the spool 31 moves in the opening direction. As a result, the flow passage area regulation unit 3 shifts to the forced fully open state in which oil is supplied to the main gallery 8 on a priority basis.

Figure 7B:
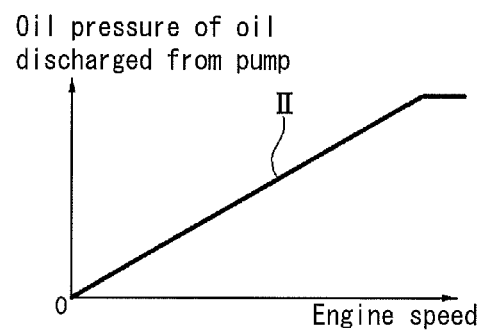
FIG. 7B illustrates a relationship between an engine speed and an oil pressure in indicated portions when the flow passage area regulation unit is forced to remain in the fully open state.
Figure 7B:
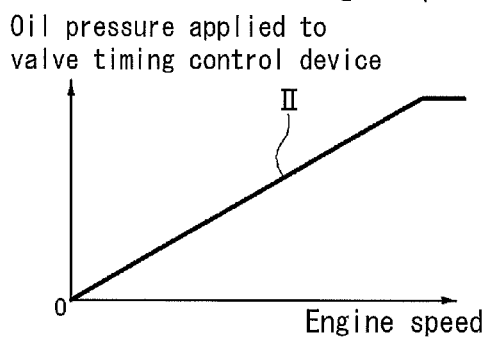
Figure 7B:
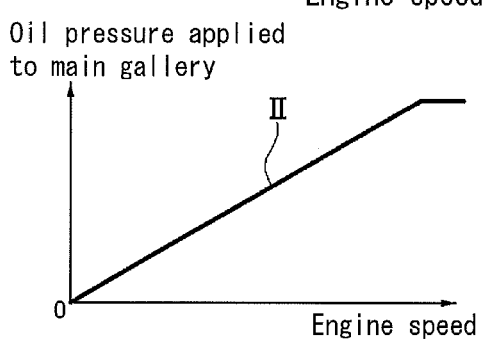

FIG. 7B illustrates a relationship between the oil pressure of the oil discharged from the pump 1, the oil pressure applied to the valve timing control device 2, and the oil pressure applied to the main gallery 8. As FIG. 7B illustrates, both the oil pressure applied to the valve timing control device 2 and the oil pressure applied to the main gallery 8 increase corresponding to the increase of the oil pressure of the oil discharged from the pump 1.

After the warming up of the engine ends with the oil temperature increased to more than the first predetermined temperature T1 and when the acceleration pedal is pressed, the power is supplied to the oil control valve (OCV) 5 to bring the oil control valve (OCV) 5 in the ON state, and the oil control valve (OCV) 5 shifts to the state in which the advanced angle control is possible, as shown in FIG. 3. In other words, the valve timing control device 2 starts operating and starts using oil immediately. When the oil control valve (OCV) 5 is in the state for the advanced angle control, the oil passage 12A for the advanced angle control and the oil passage 11A for discharging the oil are connected, and the oil passage 12B for the retarded angle control and the oil return passage 11B are connected. As a result, the oil pressure in the oil passage 14 for the actuation rapidly decreases. Meanwhile, because the engine speed is low even though the oil temperature has increased, the oil pressure of the oil discharged from the pump 1 is still low and the oil pressure applied to the oil passage 13 for the lubricating oil is likewise low. As a result, the spool 31 biased by the spring 32 moves in the closing direction and the flow passage area regulation unit 3 becomes the closed state, so that oil is supplied to the valve timing control device 2 on the priority basis. Even in the closed state, the main gallery 8 receives the predetermined amount of oil via the oil passage 15 for the communicative connection.

As the engine speed increases and the oil pressure of the oil discharged from the pump 1 increases accordingly, the oil pressure in the oil passage 13 for the lubricating oil increases and the state of the flow passage area regulation unit 3 changes from the closed state as shown in FIG. 3 to the states shown in FIGS. 4 and 5, and to the fully open state as shown in FIG. 6. When the flow passage area regulation unit 3 reaches the fully open state, the main gallery 8 receives enough oil supply to lubricate the engine components operating at high speed, which uses a large amount of the lubricating oil. When the engine speed is high, the amount of oil discharged from the pump 1 is large enough to supply the valve timing control device 2 with enough oil for providing enough oil pressure in the valve timing control device 2. After the flow passage area regulation unit 3 has reached the fully open state, the control unit 3 retains the fully open state even when the retarded angle control is performed and the oil pressure from the oil passage 14 for the actuation is applied to the back surface of the second surface 31e subjected to the pressure. In other words, when the oil temperature is higher than the first predetermined temperature T1, the spool 31 changes the position depending on the oil pressure in the oil passage 13 for the lubricating oil for controlling the dimension of the flow passage area of the oil passage 13 for the lubricating oil.

Figure 7C:
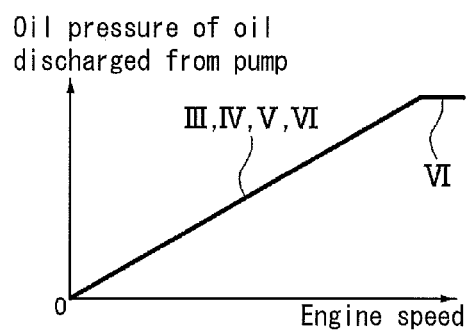
FIG. 7C illustrates a relationship between the engine speed and the oil pressure in the indicated portions in which the flow passage area regulation unit shifts from the closed state to the fully open state.
Figure 7C:
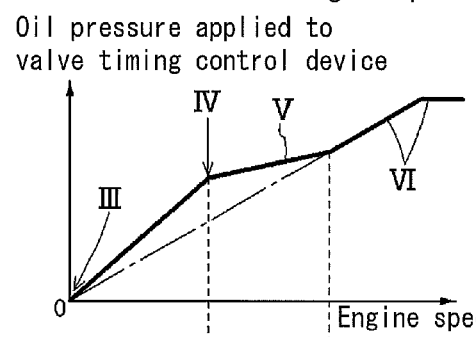
Figure 7C:
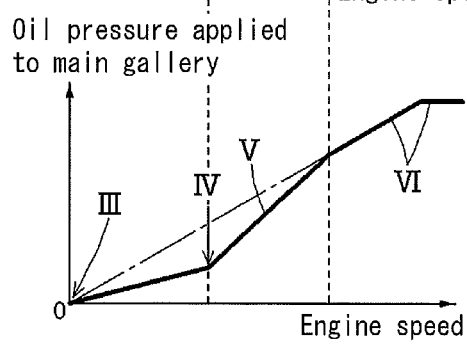

FIG. 7C illustrates the relationship between the oil pressure of the oil discharged from the pump 1, the oil pressure applied to the valve timing control device 2, and the oil pressure applied to the main gallery 8 when the flow passage area regulation unit 3 shifts from the closed state to the fully open state. Between the state of the hydraulic control device indicated with III, which is in the state as shown in FIG. 3, and the state indicated with IV, which is in the state as shown in FIG. 4, the flow passage area regulation unit 3 is in the cut off state, in which the predetermined amount of oil alone is supplied to the main gallery 8 via the oil passage 15 for the communicative connection. As a result, relative to an increase rate of the oil pressure of the oil discharged from the pump 1, the increase rate of the oil pressure applied to the main gallery 8 decreases and the increase rate of the oil pressure applied to the valve timing control device 2 increases.

When the state of the hydraulic control device is in the state indicated with V, which is in the state as shown in FIG. 5, the flow passage area regulation unit 3 is in the open state. The dimension of the flow passage area slowly increases when the oil pressure in the oil passage 13 for the lubricating oil increases. As a result, the increase rate of the oil pressure applied to the main gallery 8 increases and the increase rate of the oil pressure applied to the valve timing control device 2 decreases. When the state of the hydraulic control device is in the state indicated with VI, which is in the state as shown in FIG. 6, the flow passage area regulation unit 3 is in the fully opened state and both the oil pressure applied to the main gallery 8 and the oil pressure applied to the valve timing control device 2 increase corresponding to the increase of the oil pressure of the oil discharged from the pump 1.

The spool 31 is defined with a first range R, the range in which the dimension of the flow passage area of the oil passage 13 for the lubricating oil remains unchanged even if the spool 31 in the closed state as shown in FIG. 3 moves in the opening direction. As a result, the dimension of the flow passage area of the oil passage 13 for the lubricating oil remains unchanged when the frictional force generated between the outer peripheral surfaces of the large diameter portion 31a and the small diameter portion 31b of the spool 31 and the inner peripheral surface of the valve body 33 changes from static to dynamic immediately after the spool 31 starts moving and makes the spool 31 move rapidly in the opening direction. Due to the above characteristic, the oil pressure applied to the valve timing control device 2 remains unaffected by the change in the frictional force, so that the valve timing control device 2 is provided with a stable operation. The above characteristic restrains the dimension of the flow passage area from changing rapidly due to the change in the frictional force so that the states of the flow passage area regulation unit 3 are smoothly changed from the cut off state to the open state with the state immediately before the open state in between, thus improving the work efficiency of the pump 1.

The valve timing control device 2 is defined with small clearances between the component parts. As a result, especially when the viscosity of the oil is low, the oil may leak, or oozes out, from such small clearances, which results in decreasing an efficiency of the oil pressure applied to the valve timing control device 2. In order to operate the valve timing control device 2 under such state without decreasing the performance, a size of the pump 1 may be increased to increase the oil pressure the pump 1 provides. In other words, the pump 1 may be driven with an additional drive source that results in decreasing a fuel efficiency of the engine.

When the oil temperature is further increased to the temperature over a second predetermined temperature T2, in which the viscosity of the oil is low, the power supply to the oil control valve (OCV) 5 is cut in the OFF state, as shown in FIG. 7A. In other words, the oil control valve (OCV) 5 is retained to the state in the retarded angle control, in which the oil passage 12B for the retarded angle control and the oil passage 11A for discharging the oil are connected, and at the same time the oil passage 12A for the advanced angle control and the oil return passage 11B are connected. Thus, the relative rotational phase of the valve timing control device 2 shifts to the most retarded angle phase and the valve timing control device 2 is in the locked state with the locking mechanism 27, which in turn increases the oil pressure in the oil passage 12B for the retarded angle control. As a result the back surface of the second surface 31e subjected to the pressure receives the oil pressure via the oil passage 14 for the actuation and the spool 31 starts moving in the open direction. As can be seen from the above, when the oil temperature exceeds the second predetermined oil temperature T2, the operation of the valve timing control device 2 is stopped and the state of the flow passage area regulation unit 3 is retained to the forced fully open state so that the main gallery 8 is forcibly supplied with oil.

The second predetermined temperature T2 is defined as a temperature higher than the first predetermined temperature T1. As an example of the temperature setting, the first predetermined temperature T1 may be set to between 55 and 65° C. and the second predetermined temperature T1 may be set to between 100 and 110° C., however, the temperatures may be set to other temperature settings.

In the hydraulic control device according to the first embodiment, the oil control valve (OCV) 5 is controlled in the OFF state when the oil temperature is lower than the first predetermined temperature T1 and when the oil temperature is higher than the second predetermined temperature T2 so as to provide the forced fully open state of the flow passage area regulation unit 3. The flow passage area regulation unit 3 may be controlled to the forced fully open state by other configurations. For example, the flow passage area regulation unit 3 may be configured to control the flow passage area regulation unit 3 to the forced fully open state with the oil pressure in the oil passage 13 for the lubricating oil, by utilizing the characteristic where the oil viscosity is high when the oil temperature is lower than the first predetermined temperature T1. As an example for controlling the flow passage area regulation unit 3 to the forced fully open state when the oil temperature is higher than the second predetermined temperature T2, the flow passage area regulation unit 3 may be equipped with a control device configured to control the flow passage area regulation unit 3 to the forced fully open state by using a characteristic of a thermowax which swells and increases the volume when the temperature exceeds a predetermined temperature.

The hydraulic control device according to a second embodiment will be described next referring to FIGS. 8 to 13. The second embodiment of the hydraulic control device is the embodiment with a configuration of the flow passage area regulation unit 3 being altered from the first embodiment, thus the description regards mainly the flow passage area regulation unit 3. The second embodiment will be described under a condition when the oil temperature is higher than the first predetermined temperature T1 and when the oil temperature is lower than the second predetermined temperature T2, however, the second embodiment may be equipped with an arrangement configured to retain the flow passage area regulation unit 3 to the forced fully open state when the oil temperature is lower than the first predetermined temperature T1 or when the oil temperature is higher than the second predetermined temperature T2. Like parts and portions are designated by the like reference numbers in the first embodiment and the second embodiment.

Figure 8:
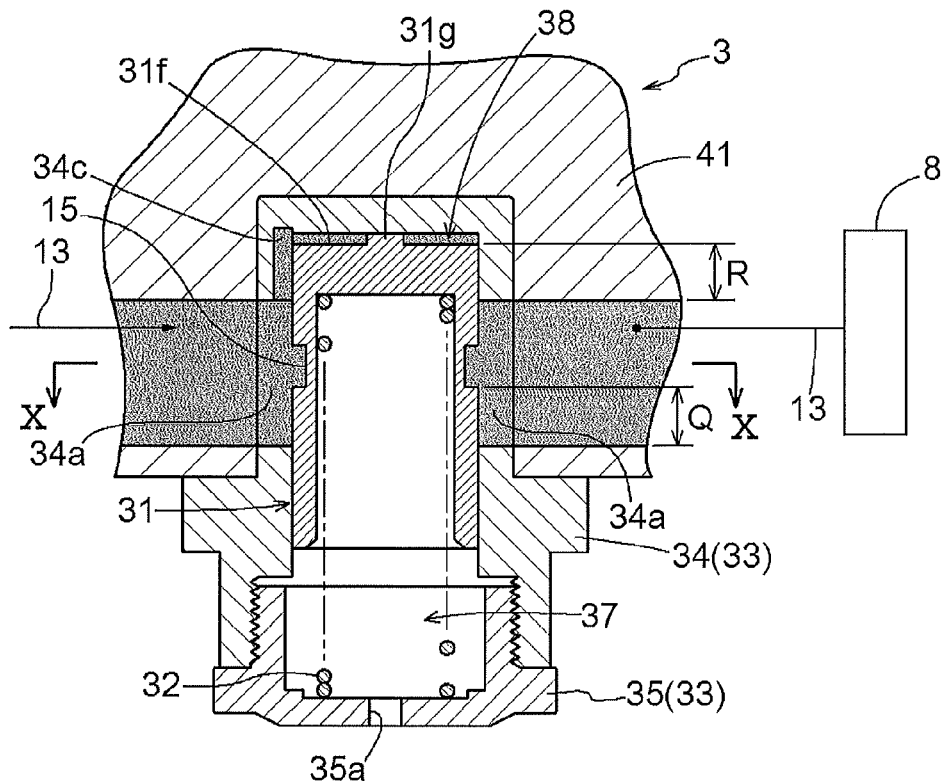
FIG. 8 illustrates a state in which the flow passage area regulation unit according to a second embodiment is in the closed state.
Figure 9:
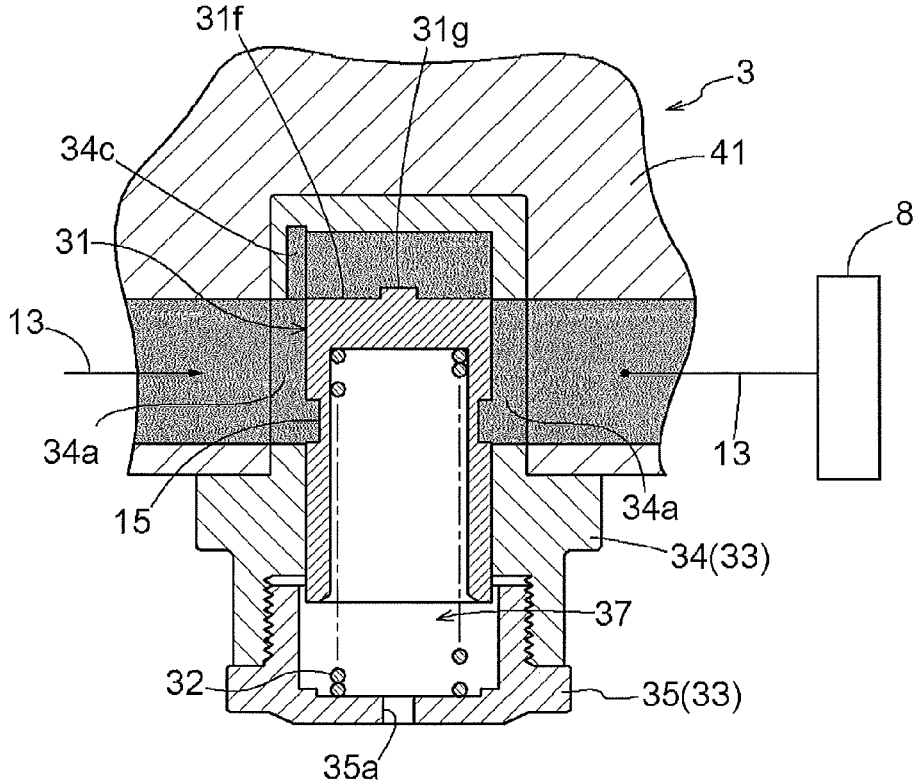
FIG. 9 illustrates a state in which the flow passage area regulation unit according to the second embodiment is in the state immediately before the flow passage area regulation unit is to be opened.
Figure 10:
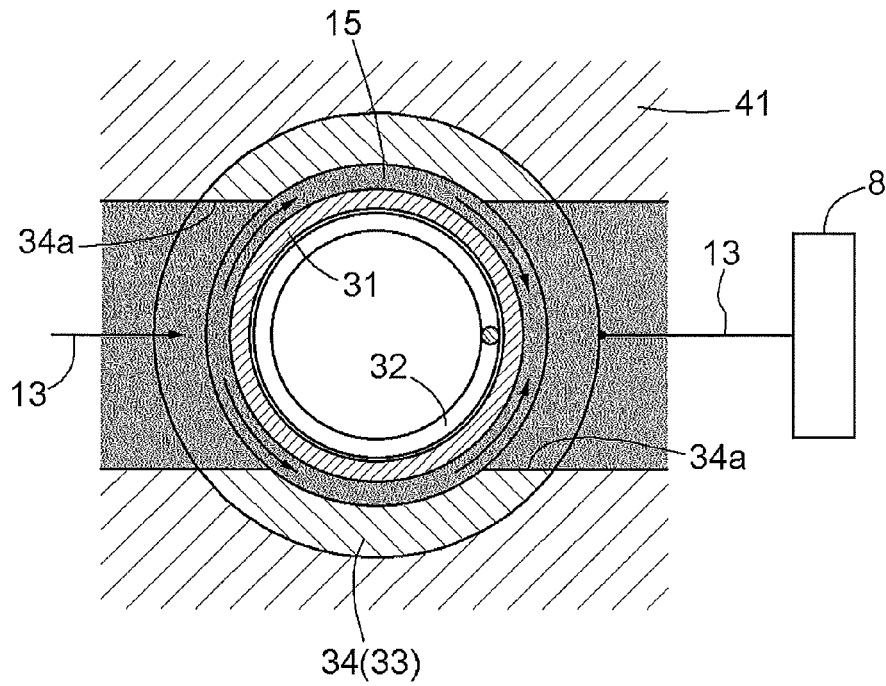
FIG. 10 is a cross-sectional view taken along X-X in FIG. 8.

FIGS. 8 to 10 illustrate the second embodiment with the oil passage 15 for the communicative connection formed as an annular groove formed on the outer peripheral surface of the spool 31. FIG. 8 illustrates the flow passage area regulation unit 3 in the closed state and FIG. 9 illustrates the flow passage area regulation unit 3 in the state immediately before the open state. FIG. 10 is a cross-sectional view taken along X-X in FIG. 8.

As shown in FIG. 8, the spool 31 is in a cylinder form with an open space on one end. The aforementioned open space together with the valve body 33 housing the spool 31 forms the space 37 for containing the spring 32 where the spring 32 is retained. The spring 32 being retained within the space 37 for containing the spring 32 constantly biases the spool 31 in the closing direction. A portion of a surface 31f subjected to the pressure on the spool 31 is formed with a projecting portion 31g, which defines the initiation space 38 between the surface 31f subjected to a pressure and the valve body 33. A portion on the inner peripheral surface of the main body 34 of the valve body 33 is guttered to form the supply passage 34c. Upon the above configuration, the oil is supplied to the initiation space 38 from the oil passage 13 for the lubricating oil via the supply passage 34c, so that the oil pressure is applied to the surface 31f of the spool 31 subjected to the pressure. As a result, when the oil pressure in the oil passage 13 for the lubricating oil increases, the spool 31 moves in the opening direction against the biasing force of the spring 32, so that the dimension of the flow passage area of the oil passage 13 for the lubricating oil increases.

On the outer peripheral surface of the spool 31, as shown in FIGS. 8 to 10, the oil passage 15 for the communicative connection serving as the bypass channel in the form of the annular groove is formed. Even when the flow passage area regulation unit 3 is in the closed state, the oil passage 15 for the communicative connection connects the upstream side and the downstream side of the oil passage 13 for the lubricating oil relative to the flow passage area regulation unit 3, so that the predetermined amount of oil is supplied to the main gallery 8.

The spool 31 is defined with the first range R, the range in which the dimension of the flow passage area of the oil passage 13 for the lubricating oil remains unchanged even if the spool 31 in the closed state as shown in FIG. 8 moves in the opening direction until the spool 31 reaches beyond the state immediately before the open state as shown in FIG. 9. As a result, the dimension of the flow passage area of the oil passage 13 for the lubricating oil remains unchanged when the frictional force generated between the outer peripheral surfaces of the spool 31 and the inner peripheral surface of the valve body 33 changes from static to dynamic immediately after the spool 31 starts moving and makes the spool 31 to move rapidly in the opening direction. Due to the above characteristic, a stable oil pressure may be applied to the valve timing control device 2 connected to the upstream side of the oil passage 13 for the lubricating oil.

As shown in FIG. 10, when the oil passage 15 for the communicative connection is formed on the outer periphery of the spool 31 to a whole span of the circumference, the oil pressure applies equally in the circumferential direction on the spool 31, so that the tilting of the spool 31 may be prevented. Providing the oil passage 15 for the communicative connection on the outer periphery of the spool 31 to a whole span of the circumference eliminates a consideration for deciding the correct circumferential direction relative to the valve body on positioning the spool 31 so that an installment process becomes simple. As an alternative, the oil passage 15 for communicative connection may be provided on the outer periphery of the spool 31 to a half the span of the circumference, for example, to an upper half of the oil passage 15 for the communicative connection shown in FIG. 10.

Referring to FIG. 8, a relationship between a length of the first range R and a length of a second range Q will be described. The second range Q is the range between an end portion in the opening direction, or a lower end in the drawing, of the oil passage 15 for the communicative connection and an end portion in the opening direction, or a lower end in the drawing, of the openings 34a for the flow passage when the flow passage area regulation unit 3 is in the closed state. In order not to cut off the flow of the oil passage 15 for the communicative connection until the state immediately before the open state as shown in FIG. 9 is reached, the length of the second range Q is configured to be equal to or more than the length of the first range R. An inappropriately long second range Q results in increasing the size of the spool 31, which in turn increases the size of the valve body 33. An appropriate length of the second range Q is the length equal to the first range R.

Figure 11:
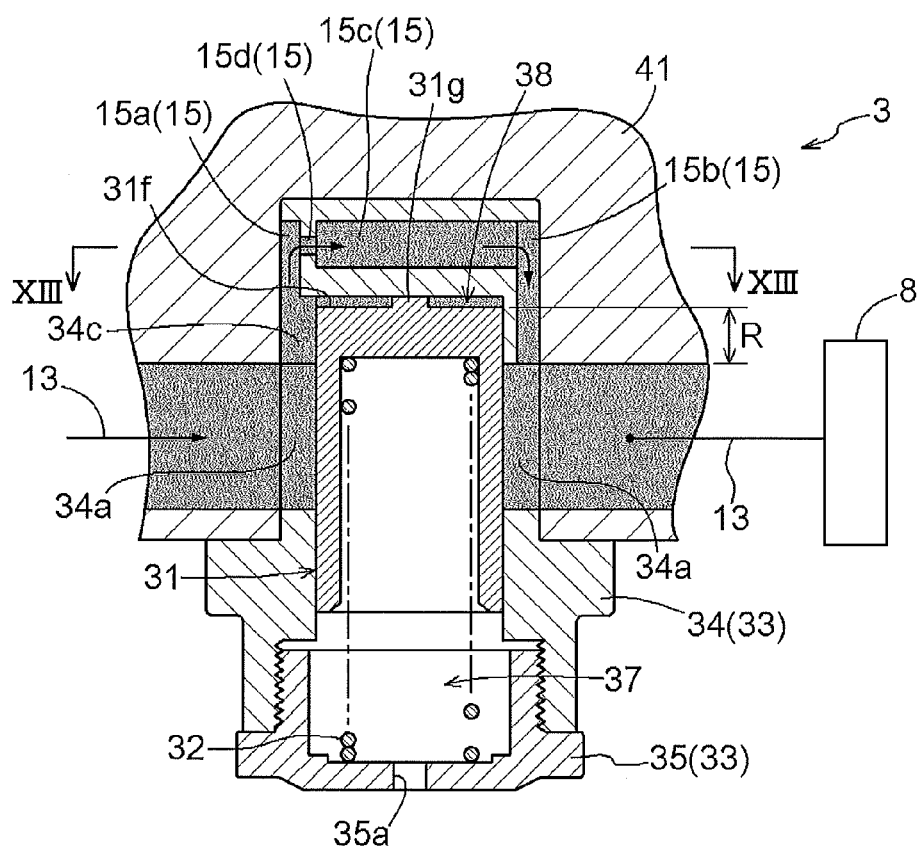
FIG. 11 illustrates a state in which a flow passage area regulation unit according to a third embodiment is in the closed state.
Figure 12:
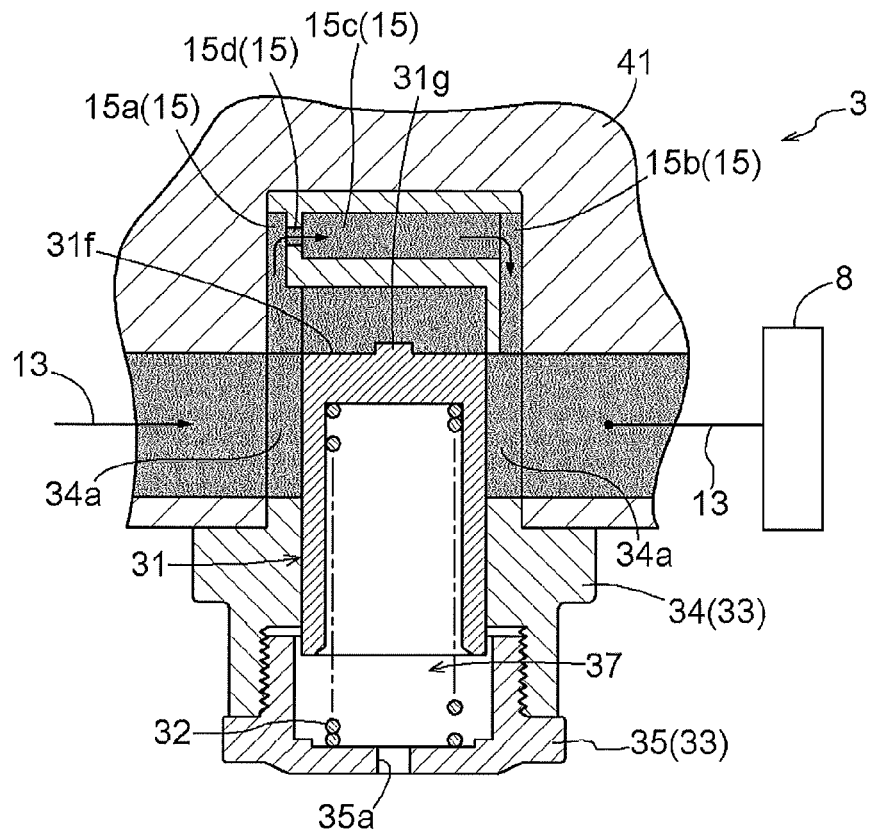
FIG. 12 illustrates a state in which the flow passage area regulation unit according to the third embodiment is in the state immediately before the flow passage area regulation unit is to be opened.
Figure 13:
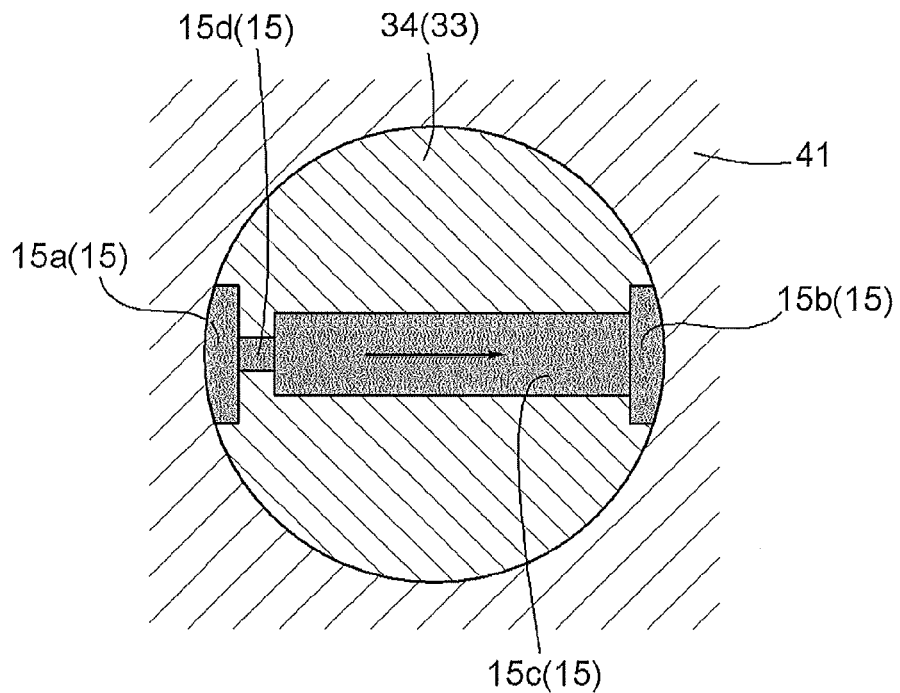
FIG. 13 is a cross-sectional view taken along XIII-XIII in FIG. 11.
Figure 14:
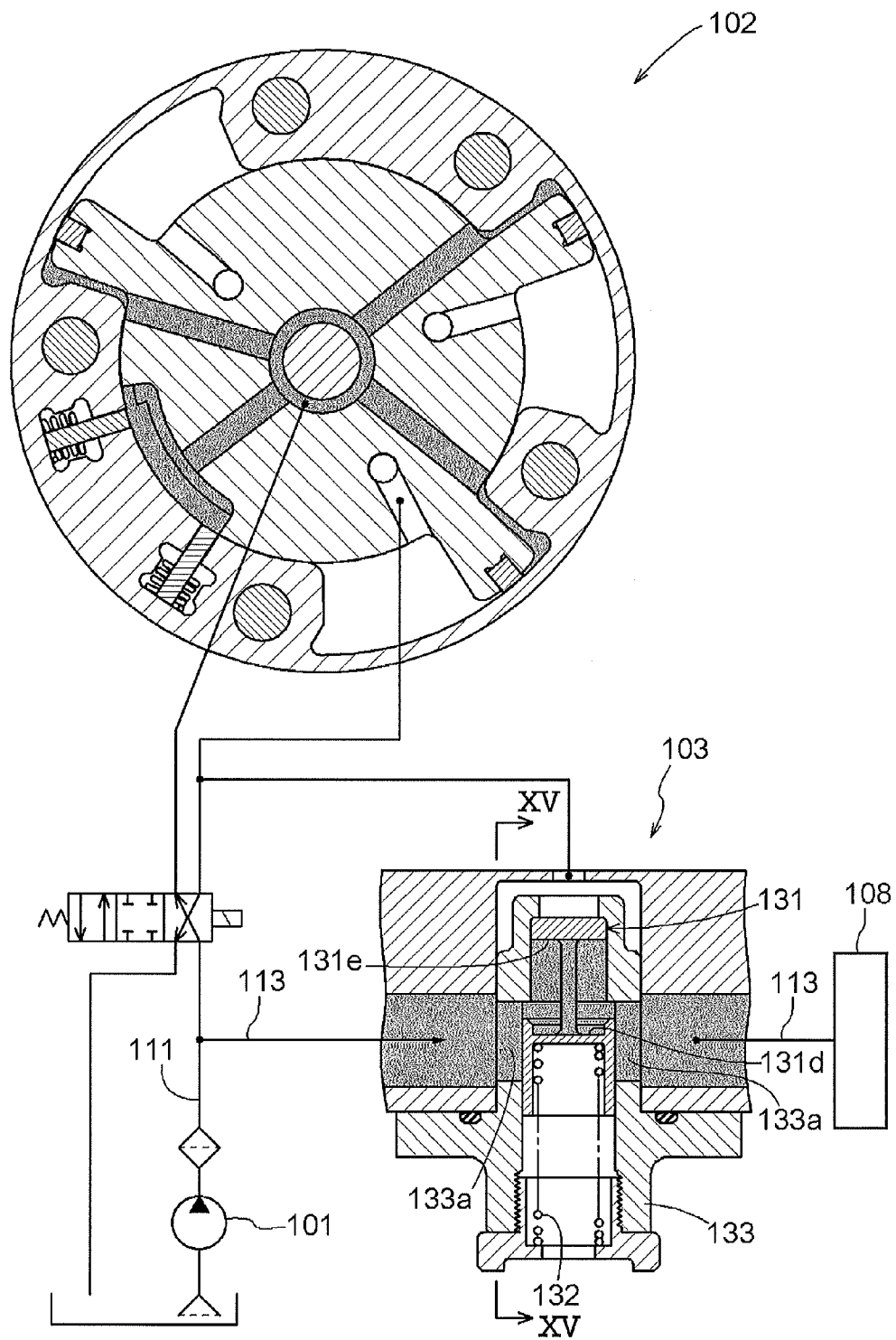
FIG. 14 illustrates a general representation of a known hydraulic control device.
Figure 15:
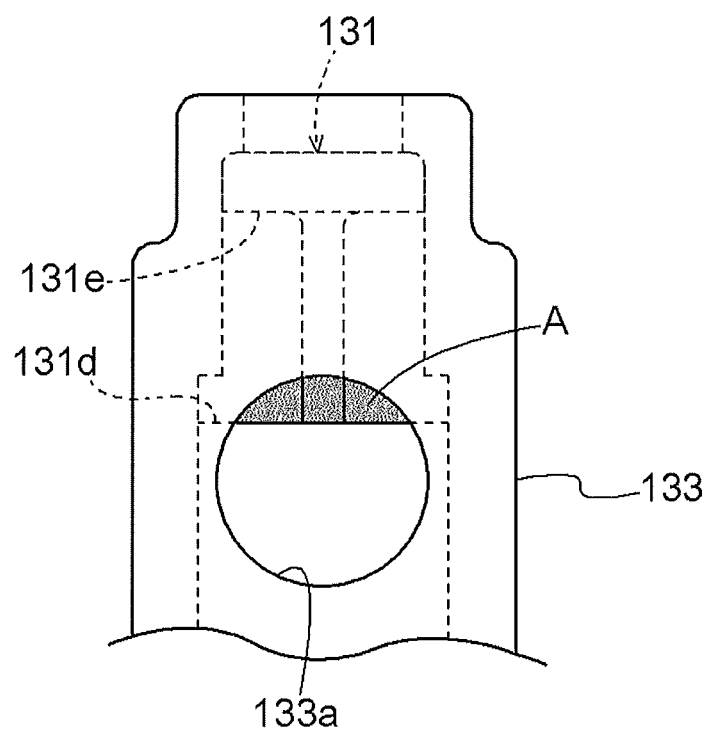
FIG. 15 is a cross-sectional view taken along XV-XV in FIG. 14.

FIGS. 11 to 13 illustrate the hydraulic control device according to a third embodiment with the oil passage 15 for the communicative connection formed on the main body 34 of the valve body 33. FIG. 11 shows the flow passage area regulation unit 3 in the closed state and FIG. 12 shows the flow passage area regulation unit 3 in the state immediately before the open state. FIG. 13 is a cross-sectional view taken along XIII-XIII in FIG. 11. The fundamental configuration of the spool 31 is similar to that of the second embodiment, thus duplicate descriptions are omitted.

The main body 34 of the valve body 33 is formed with a first elongated groove 15a that connects to the upstream side of the openings 34a for the flow passage and a second elongated groove 15b that connects to the downstream side of the openings 34a for the flow passage. The first elongated groove 15a may be formed integrally with the supply passage 34c that supplies oil to the initiation space 38, as shown in FIG. 11, or formed separately. The first elongated groove 15a and the second elongated groove 15b are in a communicative connection via a large diameter through-hole 15c, which serves as a through-hole, and a small diameter through-hole 15d. As can be seen from the above descriptions, the oil passage 15 for the communicative connection, which serves as the bypass channel, includes the first elongated groove 15a, the small diameter through-hole 15d, the large diameter through-hole 15c, and the second elongated groove 15b.

The small diameter through-hole 15d includes a portion that serves as a regulator portion. In other words, the amount of oil that flows through the oil passage 15 for the communicative connection in the closed state may be easily controlled to the predetermined amount with the small diameter through-hole 15d having a predetermined dimension with an accuracy within the tolerance, even when the first elongated groove 15a, the second elongated groove 15b, and the large diameter through-hole 15c are processed with less accuracy. Even when a large amount of oil is supplied to the oil passage 13 for the lubricating oil, the small diameter through-hole 15d limits the amount of oil that flows through the oil passage 15 for the communicative connection to the predetermined amount, so that remaining oil may be used to apply the oil pressure to the surface 31f on the spool 31 subjected to the pressure. As a result, the oil pressure setting in which the spool 31 starts moving may be easily controlled with the dimension of the small diameter through-hole 15d. Upon preparing the oil passage 15 for the communicative connection with the above configuration, each of the first elongated groove 15a, the second elongated groove 15b, the large diameter through-hole 15c and the small diameter through-hole 15d may be provided with a straight form with a simple drill processing or a like method, which is advantageous in making the manufacturing process easy.

The spool 31 is defined with the first range R, the range in which the dimension of the flow passage area of the oil passage 13 for the lubricating oil remains unchanged even if the spool 31 in the closed state as shown in FIG. 11 moves in the opening direction until the spool 31 reaches beyond the state immediately before the open state as shown in FIG. 12. As a result, the dimension of the flow passage area of the oil passage 13 for the lubricating oil remains unchanged when the frictional force generated between the outer peripheral surfaces of the spool 31 and the inner peripheral surface of the valve body 33 changes from static to dynamic immediately after the spool 31 starts moving and makes the spool 31 move rapidly in the opening direction. Due to the above characteristic, a stable oil pressure may be applied to the valve timing control device 2 connected to the upstream side of the oil passage 13 for the lubricating oil.

Other possible embodiments will be described as follows. In the aforementioned embodiments, the portion serving as the first predetermined portion is described as a valve timing control device adapted for controlling the intake valves, however, the portion serving as the first predetermined portion is not limited to the valve timing control device adapted for controlling the intake valves. For example, the portion serving as the first predetermined portion may be a valve timing control device adapted for controlling the exhaust valves, a supercharger that works under an appropriate oil pressure, or an oil jet and the like device that operates using oil pressure. In the aforementioned embodiments, the oil passage 15 for the communicative connection, which serves as the bypass channel, is formed on the valve housing 41, on the outer peripheral surface of the spool 31, or on the valve body 33, however, the configuration of the oil passage 15 for the communicative connection is not limited to the aforementioned configuration. For example, a clearance may be defined between the valve body 33 and the valve housing 41, so that the clearance may serve as the bypass channel 15.

According to an aspect of the disclosure, the hydraulic control device includes the pump 1 for discharging oil, the valve timing control device 2 configured to receive the oil discharged from the pump 1, the oil passages 11A, 12A, 12B establishing a communication between the pump 1 and the valve timing control device 2, the oil passage 13 for a lubricating oil branched from the oil passages 11A, 12A, 12B for supplying oil to the main gallery 8 arranged separately from the valve timing control device 2, the flow passage area regulation unit 3 arranged on the oil passage 13 for the lubricating oil, the flow passage area regulation unit 3 equipped with the spool 31 moving in the direction for increasing the flow passage area when the oil pressure in the oil passage 13 for the lubricating oil increases, the spool 31 moving in the direction for decreasing the flow passage area when the oil pressure in the oil passage 13 for the lubricating oil decreases, and the oil passage 15 for the communicative connection provided separately from a portion of the oil passage 13 for the lubricating oil where the spool 31 disconnects the oil passage 13 for the lubricating oil, the oil passage 15 for the communicative connection establishing the communication between the upstream side and the downstream side of the oil passage 13 for the lubricating oil relative to the flow passage area regulation unit 3, the oil passage 15 for the communicative connection supplying oil to the main gallery 8 even in the closed state in which the spool 31 disconnects the oil passage 13 for the lubricating oil.

The oil passage 15 for the communicative connection, serving as the bypass channel, connects the upstream side and the downstream side of the oil passage 13 for the lubricating oil, serving as the second channel, relative to the flow passage area regulation unit 3 even when the spool 31 is in the closed state in which the spool 31 is in the position in the most closing direction. Thus, even when the oil passage 13 for the lubricating oil is completely disconnected by the spool 31, oil is supplied to the main gallery 8 in the downstream side of the flow passage area regulation unit 3 via the oil passage 15 for the communicative connection. In this instance, the oil passage 15 for the communicative connection processed to have the pipe diameter with the accuracy within the design tolerance provides the predetermined amount of oil to flow through the oil passage 15 for the communicative connection. With such configuration, the pressure control function of the hydraulic control device is improved without increasing the manufacturing cost that corresponds to improving the processing accuracy of components, for example, the spool 31 and the valve body 33. The oil passage 15 for the communicative connection is provided separately from the portion where the spool 31 disconnects the oil passage 13 for the lubricating oil so that the dimension of the flow passage area for the oil passage 15 for the communicative connection may be retained to a constant predetermined dimension, without being affected by the dimension of the flow passage area of the oil passage 13 for the lubricating oil. Such configuration prevents from the oil pressure in the oil passage 15 for the communicative connection to affect the movement of the spool 31, which in turn affects the dimension of flow passage area of the oil passage 13 for the lubricating oil.

According to another aspect of the disclosure, the hydraulic control device includes the oil passage 15 for the communicative connection formed on the spool 31.

When the oil passage 15 for the communicative connection is formed on the spool 31, the upstream side and the downstream side of the oil passage 13 for the lubricating oil may be connected with a simple processing on the spool 31. Such configuration restrains the size of the flow passage area regulation unit 3 to increase and simultaneously makes the installation easier while providing the communicative connection between the upstream side and the downstream side of the oil passage 13 for the lubricating oil with a certainty.

According to further aspect of the disclosure, the hydraulic control device includes the oil passage 15 for the communicative connection provided as the annular groove formed on the outer peripheral surface of the spool 31.

When the oil passage 15 for the communicative connection is formed on the outer peripheral surface of the spool 31, the valve body 33 may be restrained from a size increase resulting from acquiring a space for the oil passage 15 for the communicative connection. Restraining the valve body 33 from the size increase is advantageous on the space the flow passage area regulation unit 3 occupies on installment. The oil passage 15 for the communicative connection formed as the annular groove on the outer periphery of the spool 31 eliminates the consideration for deciding the correct circumferential direction relative to the valve body on positioning the spool 31 to the valve body so that the installment process becomes simple. In addition, the oil pressure applies equally in the circumferential direction on the spool 31, so that the tilting of the spool 31 may be prevented.

According to another aspect of the disclosure, the hydraulic control device includes the oil passage 15 for the communicative connection formed on the valve body 33, which houses the spool 31.

When the oil passage 15 for the communicative connection is formed on the valve body 33, the upstream side and the downstream side of the oil passage 13 for the lubricating oil may be connected with a simple processing of the valve body 33. Such configuration restrains the size of the flow passage area regulation unit 3 to increase and simultaneously makes the installation easier while providing the communicative connection between the upstream side and the downstream side of the oil passage 13 for the lubricating oil with the certainty.

According to further aspect of the disclosure, the hydraulic control device includes the oil passage 15 for the communicative connection provided as the annular groove formed on the valve body 33, which houses the spool 31.

Forming the oil passage 15 for the communicative connection as the annular groove on the valve body 33 eliminates the consideration for positioning the valve body 33 relative to the valve housing 41 in a certain direction for installation or for positioning the spool 31 relative to the valve body 33 in a certain direction for installation so that the installment process becomes simple while providing the communicative connection between the upstream side and the downstream side of the oil passage 13 for the lubricating oil with the certainty.

According to another aspect of the disclosure, the hydraulic control device includes the oil passage 15 for the communicative connection having the first elongated groove 15a formed on the outer peripheral surface of the valve body 33, which houses the spool 31, the first elongated groove 15a connecting to the upstream side of the oil passage 13 for the lubricating oil, the second elongated groove 15b formed on the outer peripheral surface of the valve body 33, the second elongated groove 15b connecting to the downstream side of the oil passage 13 for the lubricating oil, and the large diameter through-hole 15c formed on the valve body 33 and connecting the first elongated groove 15a and the second elongated groove 15b.

Upon preparing the oil passage 15 for the communicative connection with the above configuration, the first elongated groove 15c and the second elongated groove 15b are formed first on the outer peripheral surface of the valve body 33, then the large diameter through-hole 15c connecting the first elongated groove 15a and the second elongated groove 15b is provided, thus the processing of the oil passage 15 for the communicative connection is easy. When each of the first elongated groove 15a, the second elongated groove 15b, and the large diameter through-hole 15c are provided in the straight form with the simple drill processing or a similar method, the manufacturing process of the oil passage 15 for the communicative connection becomes even easier. In addition, forming the oil passage 15 for the communicative connection on the valve body 33 may eliminate the positioning process for connecting the flow passage when installing the spool 31, so that the installment process becomes simple.

According to further aspect of the disclosure, the hydraulic control device includes the large diameter through-hole 15c having a regulator portion 15d with a smaller cross sectional area relative to a remaining portion of the large diameter through-hole 15c.

When the through hole forming a portion of the oil passage 15 for the communicative connection is provided with the small diameter through-hole 15d, the amount of oil that flows through the oil passage 15 for the communicative connection in the closed state may be controlled to the predetermined amount with the dimension of the small diameter through-hole 15d. Even when a large amount of oil is supplied to the oil passage 13 for the lubricating oil, the small diameter through-hole 15d limits the amount of oil that flows through the oil passage 15 for the communicative connection to the predetermined amount, so that remaining oil may be used to apply the oil pressure to the spool 31. In addition, the oil pressure setting in which the spool 31 starts moving may be easily controlled with the dimension of the small diameter through-hole 15d. In other words, when the small diameter through-hole 15d having the predetermined dimension may be provided with the accuracy within the tolerance, other portions of the oil passage 15 for the communicative connection may be processed with less accuracies for decreasing the manufacturing cost.

According to another aspect of the disclosure, the hydraulic control device includes the oil passage 15 for the communicative connection formed on the valve housing 41 to which the flow passage area regulation unit 3 is provided.

Forming the oil passage 15 for the communicative connection on the valve housing 41 eliminates the consideration for positioning, for example, the spool 31 and the valve body 33 in certain directions for installation so that the installment process becomes simple while providing the communicative connection between the upstream side and the downstream side of the oil passage 13 for the lubricating oil with the certainty. In addition, the valve body 33 may be reduced in size without having the flow passage being formed.

According to further aspect of the disclosure, the hydraulic control device includes the pump 1 for discharging oil, the valve timing control device 2 configured to receive the oil discharged from the pump 1, the oil passages 11A, 12A, 12B establishing the communication between the pump 1 and the valve timing control device 2, the oil passage 13 for the lubricating oil branched from the first channel 11A, 12A, 12B for supplying oil to the main gallery 8 arranged separately from the valve timing control device 2, the flow passage area regulation unit 3 moving in the direction for increasing the flow passage area when the oil pressure in the oil passage 13 for the lubricating oil increases and moving in the direction for decreasing the flow passage area when the oil pressure in the oil passage 13 for the lubricating oil decreases, and the oil passage 15 for the communicative connection supplying oil to the main gallery 8 during which the flow passage area regulation unit 3 is disconnecting the oil passage 13 for the lubricating oil by establishing the communication between the upstream side and the downstream side of the oil passage 13 for the lubricating oil relative to the flow passage area regulation unit 3.

The oil passage 15 for the communicative connection connects the upstream side and the downstream side of the oil passage 13 for the lubricating oil relative to the flow passage area regulation unit 3 when the flow passage area regulation unit 3 is cutting off the oil that flows through the oil passage 13 for the lubricating oil. Thus, even when the oil passage 13 for the lubricating oil is completely disconnected by the flow passage area regulation unit 3, oil is supplied to the main gallery 8 in the downstream side of the flow passage area regulation unit 3 via the oil passage 15 for the communicative connection. In this instance, the oil passage 15 for the communicative connection processed to have the pipe diameter with the accuracy within the design tolerance provides the predetermined amount of oil to flow through the oil passage 15 for the communicative connection. As a result, the oil passage 15 for the communicative connection that constantly provides the predetermined oil amount to the main gallery 8 may be provided with a simple processing that restrains from increasing manufacturing cost.

According to another aspect of the disclosure, the hydraulic control device includes the pump 1 for discharging oil, the valve timing control device 2 configured to receive the oil discharged from the pump 1, the oil passages 11A, 12A, 12B establishing the communication between the pump 1 and the valve timing control device 2, the oil passage 13 for the lubricating oil branched from the oil passages 11A, 12A, 12B and supplying oil to the main gallery 8 arranged separately from the valve timing control device 2, the flow passage area regulation unit 3 arranged on the oil passage 13 for the lubricating oil for controlling the oil pressure applies on the valve timing control device 2 by controlling the flow passage area of the oil passage 13 for the lubricating oil, and the oil passage 15 for the communicative connection supplying oil to the main gallery 8 even when the flow passage area regulation unit 3 is disconnecting the oil passage 13 for a lubricating oil.

The oil passage 15 for the communicative connection connects the upstream side and the downstream side of the oil passage 13 for the lubricating oil relative to the flow passage area regulation unit 3 when the flow passage area regulation unit 3 is cutting off the oil that flows through the oil passage 13 for the lubricating oil. Thus, even when the oil passage 13 for the lubricating oil is completely disconnected by the flow passage area regulation unit 3, oil is supplied to the main gallery 8 in the downstream side of the flow passage area regulation unit 3 via the oil passage 15 for the communicative connection. In this instance, the oil passage 15 for the communicative connection processed to have the pipe diameter with the accuracy within the design tolerance provides the predetermined amount of oil to flow through the oil passage 15 for the communicative connection. As a result, the oil passage 15 for the communicative connection that constantly provides the predetermined oil amount to the main gallery 8 may be provided with a simple processing that restrains from increasing manufacturing cost.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A hydraulic control device comprising:
   a pump for discharging oil;
   a first predetermined portion configured to receive the oil discharged from the pump;
   a first channel establishing a communication between the pump and the first predetermined portion;
   a second channel branched from the first channel for supplying oil to a second predetermined portion arranged separately from the first predetermined portion;
   a flow passage area regulation unit arranged on the second channel, the flow passage area regulation unit equipped with a spool moving in a direction for increasing a flow passage area when an oil pressure in the second channel increases and moving in a direction for decreasing a flow passage area when the oil pressure in the second channel decreases, the spool possessing an outer peripheral surface, the flow passage area regulation unit including a biasing member retained in a space formed in the spool, the biasing member biasing the spool in a direction to reduce a dimension of the flow passage area of the second channel for lubricating oil; and
   a bypass channel provided separately from a portion of the second channel where the spool disconnects the second channel, the bypass channel establishing a communication between an upstream side and a downstream side of the second channel relative to the flow passage area regulation unit, the bypass channel supplying oil to the second predetermined portion even in a closed state in which the spool disconnects the second channel, the bypass channel being an annular groove on the outer peripheral surface of the spool so that oil flows on the outer peripheral surface of the spool along the annular groove.

2. The hydraulic control device according to claim 1, wherein the bypass channel is formed on a valve body, which houses the spool.

3. The hydraulic control device according to claim 1, wherein the bypass channel is provided as an annular groove formed on the valve body, which houses the spool.

4. The hydraulic control device according to claim 1, wherein the bypass channel includes
   a first elongated groove formed on an outer peripheral surface of the valve body, which houses the spool, the first elongated groove connecting to the upstream side of the second channel,
   a second elongated groove formed on the outer peripheral surface of the valve body, the second elongated groove connecting to the downstream side of the second channel, and
   a through-hole formed on the valve body and connecting the first elongated groove and the second elongated groove.

5. The hydraulic control device according to claim 4, wherein the through-hole includes a regulator portion having a smaller cross sectional area relative to a remaining portion of the through-hole.

6. The hydraulic control device according to claim 1, wherein the bypass channel is formed on the valve housing to which the flow passage area regulation unit is provided.

7. The hydraulic control device according to claim 1, wherein the first predetermined portion is a valve timing control device actuated by oil pressure provided by the oil supplied by the pump, and
   the second predetermined portion is an engine lubricating device configured to lubricate engine parts by the oil supplied by the pump.

8. The hydraulic control device according to claim 1,
   wherein the flow passage area regulation unit includes a valve body housing the spool,
   wherein the valve body includes a space comprising the biasing member,
   wherein a vent is formed at the valve body, the vent communicating the space to atmosphere.

* * * * *